(12) United States Patent
Wassvik et al.

(10) Patent No.: US 11,943,563 B2
(45) Date of Patent: Mar. 26, 2024

(54) VIDEOCONFERENCING TERMINAL AND METHOD OF OPERATING THE SAME

(71) Applicant: FlatFrog Laboratories AB, Lund (SE)

(72) Inventors: Ola Wassvik, Lammhult (SE); Mats Peter Wallander, Lund (SE)

(73) Assignee: FlatFrog Laboratories, AB, Lund (SE)

( * ) Notice: Subject to any disclaimer, the term of this patent is extended or adjusted under 35 U.S.C. 154(b) by 172 days.

(21) Appl. No.: 17/424,680

(22) PCT Filed: Jan. 17, 2020

(86) PCT No.: PCT/SE2020/050043
§ 371 (c)(1),
(2) Date: Jul. 21, 2021

(87) PCT Pub. No.: WO2020/153890
PCT Pub. Date: Jul. 30, 2020

(65) Prior Publication Data
US 2022/0109809 A1    Apr. 7, 2022

(30) Foreign Application Priority Data
Jan. 25, 2019  (SE) .................................. 1930022-7

(51) Int. Cl.
*H04N 7/15* (2006.01)
*G06T 5/00* (2006.01)
*H04N 7/14* (2006.01)

(52) U.S. Cl.
CPC ............. *H04N 7/144* (2013.01); *G06T 5/005* (2013.01); *H04N 7/15* (2013.01)

(58) Field of Classification Search
CPC ........... H04N 7/15; H04N 7/144; G06T 5/005

USPC ............................................ 348/14.01–14.16
See application file for complete search history.

(56) References Cited

U.S. PATENT DOCUMENTS

| 3,375,053 A | 3/1968 | Ward |
| 3,440,426 A | 4/1969 | Bush |
| 3,478,220 A | 11/1969 | Milroy |
| 3,553,680 A | 1/1971 | Cooreman |
| 3,673,327 A | 6/1972 | Johnson et al. |
| 4,129,384 A | 12/1978 | Walker et al. |

(Continued)

FOREIGN PATENT DOCUMENTS

| AU | 2008 280 952 A1 | 3/2009 |
| AU | 2014201966 A | 4/2014 |

(Continued)

OTHER PUBLICATIONS

International Search Report for International App. No. PCT/SE2020/050043, dated Feb. 24, 2020, in 3 pages.

(Continued)

*Primary Examiner* — Melur Ramakrishnaiah
(74) *Attorney, Agent, or Firm* — Knobbe, Martens, Olson, & Bear, LLP

(57) ABSTRACT

A method of videoconferencing comprises displaying an image of a remote user on a display and capturing an image of a local user at a user position in front of the display. The at least one camera is located at a camera position behind the display. The method comprises modifying an image to be displayed based on the camera position of the at least one camera with respect to the display and based on the user position of the local user with respect to the display.

15 Claims, 9 Drawing Sheets

(56) References Cited

U.S. PATENT DOCUMENTS

| | | |
|---|---|---|
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,751,379 A | 6/1988 | Sasaki et al. |
| 4,752,655 A | 6/1988 | Tajiri et al. |
| 4,766,424 A | 8/1988 | Adler et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,550 A | 9/1989 | Hiroaki et al. |
| 4,868,912 A | 9/1989 | Doering |
| 4,891,829 A | 1/1990 | Deckman et al. |
| 4,916,308 A | 4/1990 | Meadows |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,414,413 A | 5/1995 | Tamaru et al. |
| 5,434,373 A | 7/1995 | Komaki |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,515,083 A | 5/1996 | Casebolt et al. |
| 5,525,764 A | 6/1996 | Junkins et al. |
| 5,526,422 A | 6/1996 | Keen |
| 5,539,514 A | 7/1996 | Shishido et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,608,550 A | 3/1997 | Epstein et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,729,250 A | 3/1998 | Bishop et al. |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,031,524 A | 2/2000 | Kunert |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,677,934 B1 | 1/2004 | Blanchard |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,401 B2 | 12/2005 | Akitt et al. |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,087,907 B1 | 8/2006 | Lalovic et al. |
| 7,117,157 B1 | 10/2006 | Taylor et al. |
| 7,133,031 B2 | 11/2006 | Wang et al. |
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,528,898 B2 | 5/2009 | Hashimoto |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,729,056 B2 | 6/2010 | Hwang et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |

(56) References Cited

U.S. PATENT DOCUMENTS

| | | |
|---|---|---|
| 8,149,221 B2 | 4/2012 | Newton |
| 8,184,108 B2 | 5/2012 | Smits |
| 8,218,154 B2 | 7/2012 | Østergaard et al. |
| 8,274,495 B2 | 9/2012 | Lee |
| 8,314,773 B2 | 11/2012 | Low et al. |
| 8,319,729 B2 | 11/2012 | Choi et al. |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,384,693 B2 | 2/2013 | Newton |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,001,086 B1 | 4/2015 | Saini |
| 9,024,896 B2 | 5/2015 | Chen |
| 9,024,916 B2 | 5/2015 | Christiansson |
| 9,035,909 B2 | 5/2015 | Christiansson |
| 9,063,614 B2 | 6/2015 | Petterson et al. |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,201,520 B2 | 12/2015 | Benko et al. |
| 9,207,800 B1 | 12/2015 | Eriksson et al. |
| 9,213,445 B2 | 12/2015 | King et al. |
| 9,274,645 B2 | 3/2016 | Christiansson et al. |
| 9,280,237 B2 | 3/2016 | Kukulj |
| 9,291,845 B2 | 3/2016 | Shin et al. |
| 9,317,146 B1 | 4/2016 | Hufnagel |
| 9,317,168 B2 | 4/2016 | Christiansson et al. |
| 9,323,396 B2 | 4/2016 | Han et al. |
| 9,366,565 B2 | 6/2016 | Uvnäs |
| 9,366,802 B2 | 6/2016 | Lee et al. |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,645,679 B2 | 5/2017 | Eriksson et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,874,978 B2 | 1/2018 | Wall |
| 9,983,626 B2 | 5/2018 | Cao et al. |
| 10,013,107 B2 | 7/2018 | Christiansson et al. |
| 10,019,113 B2 | 7/2018 | Christiansson et al. |
| 10,168,835 B2 | 1/2019 | Wallander et al. |
| 10,282,035 B2 | 5/2019 | Kocovksi et al. |
| 10,437,389 B2 | 10/2019 | Skagmo et al. |
| 10,579,227 B1 | 3/2020 | Bura et al. |
| 10,606,416 B2 | 3/2020 | Skagmo et al. |
| 10,649,585 B1 | 5/2020 | van Beek et al. |
| 10,775,937 B2 | 9/2020 | Christiansson et al. |
| 10,884,275 B2 | 1/2021 | Yang et al. |
| 11,256,371 B2 | 2/2022 | Bergstrom et al. |
| 11,567,610 B2 | 1/2023 | Bergstrom et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2001/0055411 A1 | 12/2001 | Black |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0161871 A1 | 7/2006 | Hotelling et al. |

(56) References Cited

U.S. PATENT DOCUMENTS

| | | |
|---|---|---|
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0080811 A1 | 4/2008 | Deane |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0133265 A1 | 6/2008 | Silkaitis et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0000831 A1 | 1/2009 | Miller et al. |
| 2009/0002340 A1 | 1/2009 | Van Genechten |
| 2009/0006292 A1 | 1/2009 | Block |
| 2009/0040786 A1 | 2/2009 | Mori |
| 2009/0058832 A1 | 3/2009 | Newton |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0254869 A1 | 10/2009 | Ludwig et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0278913 A1 | 11/2009 | Rosenfeld et al. |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0207874 A1 | 8/2010 | Yuxin et al. |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0080361 A1 | 4/2011 | Miller et al. |
| 2011/0084939 A1 | 4/2011 | Gepner et al. |
| 2011/0090176 A1 | 4/2011 | Christiansson et al. |
| 2011/0102374 A1 | 5/2011 | Wassvik et al. |
| 2011/0102538 A1 | 5/2011 | Tan |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0181552 A1 | 7/2011 | Magnus et al. |

(56) References Cited

U.S. PATENT DOCUMENTS

| | | |
|---|---|---|
| 2011/0205186 A1 | 8/2011 | Newton et al. |
| 2011/0205189 A1 | 8/2011 | Newton |
| 2011/0210946 A1 | 9/2011 | Goertz et al. |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291944 A1 | 12/2011 | Simmons et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0007835 A1 | 1/2012 | Yu-Jen et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0050336 A1 | 3/2012 | Nave et al. |
| 2012/0056807 A1 | 3/2012 | Chapman et al. |
| 2012/0062474 A1 | 3/2012 | Weishaupt et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0170056 A1 | 7/2012 | Jakobsen et al. |
| 2012/0181419 A1 | 7/2012 | Momtahan |
| 2012/0182266 A1 | 7/2012 | Han |
| 2012/0188205 A1 | 7/2012 | Jansson et al. |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0212457 A1 | 8/2012 | Drumm |
| 2012/0217882 A1 | 8/2012 | Wong et al. |
| 2012/0218200 A1 | 8/2012 | Glazer et al. |
| 2012/0218229 A1 | 8/2012 | Drumm |
| 2012/0223916 A1 | 9/2012 | Kukulj |
| 2012/0242622 A1 | 9/2012 | Tseng et al. |
| 2012/0249478 A1 | 10/2012 | Chang et al. |
| 2012/0256882 A1 | 10/2012 | Christiansson et al. |
| 2012/0257004 A1* | 10/2012 | Smith .................. H04N 7/144 348/E7.083 |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2012/0313865 A1 | 12/2012 | Pearce |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0055143 A1 | 2/2013 | Martin et al. |
| 2013/0076697 A1 | 3/2013 | Goertz et al. |
| 2013/0082980 A1 | 4/2013 | Gruhlke et al. |
| 2013/0093838 A1* | 4/2013 | Tan ..................... H04N 7/144 348/14.16 |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0136304 A1 | 5/2013 | Anabuki et al. |
| 2013/0141388 A1 | 6/2013 | Ludwig et al. |
| 2013/0141395 A1 | 6/2013 | Holmgren et al. |
| 2013/0154983 A1 | 6/2013 | Christiansson et al. |
| 2013/0155027 A1 | 6/2013 | Holmgren et al. |
| 2013/0155655 A1 | 6/2013 | Lee et al. |
| 2013/0155723 A1 | 6/2013 | Coleman |
| 2013/0158504 A1 | 6/2013 | Ruchti et al. |
| 2013/0181896 A1 | 7/2013 | Gruhlke et al. |
| 2013/0181953 A1 | 7/2013 | Hinckley et al. |
| 2013/0187891 A1 | 7/2013 | Eriksson et al. |
| 2013/0201142 A1 | 8/2013 | Suarez Rovere |
| 2013/0222344 A1 | 8/2013 | Lu et al. |
| 2013/0222346 A1 | 8/2013 | Chen et al. |
| 2013/0234991 A1 | 9/2013 | Sparf |
| 2013/0241886 A1 | 9/2013 | Eriksson et al. |
| 2013/0241887 A1 | 9/2013 | Sharma |
| 2013/0249833 A1 | 9/2013 | Christiansson et al. |
| 2013/0257810 A1 | 10/2013 | Niu et al. |
| 2013/0269867 A1 | 10/2013 | Trott |
| 2013/0275082 A1 | 10/2013 | Follmer et al. |
| 2013/0279190 A1 | 10/2013 | Huang |
| 2013/0285920 A1 | 10/2013 | Colley |
| 2013/0285968 A1 | 10/2013 | Christiansson et al. |
| 2013/0300714 A1 | 11/2013 | Goh et al. |
| 2013/0300716 A1 | 11/2013 | Craven-Bartle et al. |
| 2013/0307795 A1 | 11/2013 | Suarez Rovere |
| 2013/0307796 A1 | 11/2013 | Liu et al. |
| 2013/0321740 A1 | 12/2013 | An et al. |
| 2013/0342490 A1 | 12/2013 | Wallander et al. |
| 2014/0002400 A1 | 1/2014 | Christiansson et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0111478 A1 | 4/2014 | Lin et al. |
| 2014/0111480 A1 | 4/2014 | Kim et al. |
| 2014/0125633 A1 | 5/2014 | Fåhraeus et al. |
| 2014/0139467 A1 | 5/2014 | Ghosh et al. |
| 2014/0152624 A1 | 6/2014 | Piot et al. |
| 2014/0160762 A1 | 6/2014 | Dudik et al. |
| 2014/0192023 A1 | 7/2014 | Hoffman |
| 2014/0210793 A1 | 7/2014 | Eriksson et al. |
| 2014/0218467 A1* | 8/2014 | You ..................... H04N 13/239 348/14.16 |
| 2014/0226084 A1 | 8/2014 | Utukuri et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320459 A1 | 10/2014 | Pettersson et al. |
| 2014/0320460 A1 | 10/2014 | Johansson et al. |
| 2014/0324953 A1 | 10/2014 | Seo et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2014/0380193 A1 | 12/2014 | Coplen et al. |
| 2015/0002386 A1 | 1/2015 | Mankowski et al. |

(56) References Cited

U.S. PATENT DOCUMENTS

| | | |
|---|---|---|
| 2015/0009687 A1 | 1/2015 | Lin |
| 2015/0015497 A1 | 1/2015 | Leigh |
| 2015/0026630 A1 | 1/2015 | Bullock |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0062085 A1 | 3/2015 | Lu et al. |
| 2015/0070327 A1 | 3/2015 | Hsieh et al. |
| 2015/0083891 A1 | 3/2015 | Wallander |
| 2015/0103013 A9 | 4/2015 | Huang |
| 2015/0121691 A1 | 5/2015 | Wang |
| 2015/0130769 A1 | 5/2015 | Björklund |
| 2015/0131010 A1 | 5/2015 | Sugiyama |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0154291 A1 | 6/2015 | Shepherd et al. |
| 2015/0199071 A1 | 7/2015 | Hou |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0256658 A1 | 9/2015 | Shin et al. |
| 2015/0261323 A1 | 9/2015 | Cui et al. |
| 2015/0271481 A1 | 9/2015 | Guthrie et al. |
| 2015/0286698 A1 | 10/2015 | Gagnier et al. |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0334138 A1 | 11/2015 | Conklin et al. |
| 2015/0339000 A1 | 11/2015 | Lee et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2015/0373864 A1 | 12/2015 | Jung |
| 2016/0004898 A1 | 1/2016 | Holz |
| 2016/0026297 A1 | 1/2016 | Shinkai et al. |
| 2016/0026337 A1 | 1/2016 | Wassvik et al. |
| 2016/0034099 A1 | 2/2016 | Christiansson et al. |
| 2016/0041629 A1 | 2/2016 | Rao et al. |
| 2016/0050746 A1 | 2/2016 | Wassvik et al. |
| 2016/0062549 A1 | 3/2016 | Drumm et al. |
| 2016/0070415 A1 | 3/2016 | Christiansson et al. |
| 2016/0070416 A1 | 3/2016 | Wassvik |
| 2016/0092021 A1 | 3/2016 | Tu et al. |
| 2016/0103026 A1 | 4/2016 | Povazay et al. |
| 2016/0117019 A1 | 4/2016 | Michiaki |
| 2016/0124546 A1 | 5/2016 | Chen et al. |
| 2016/0124551 A1 | 5/2016 | Christiansson et al. |
| 2016/0077616 A1 | 6/2016 | Durojaiye et al. |
| 2016/0154532 A1 | 6/2016 | Campbell |
| 2016/0154533 A1 | 6/2016 | Eriksson et al. |
| 2016/0179261 A1 | 6/2016 | Drumm |
| 2016/0202841 A1 | 7/2016 | Christiansson et al. |
| 2016/0209886 A1 | 7/2016 | Suh et al. |
| 2016/0216844 A1 | 7/2016 | Bergström |
| 2016/0224144 A1 | 8/2016 | Klinghult et al. |
| 2016/0255713 A1 | 9/2016 | Kim et al. |
| 2016/0295711 A1 | 10/2016 | Ryu et al. |
| 2016/0299583 A1 | 10/2016 | Watanabe |
| 2016/0306501 A1 | 10/2016 | Drumm et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0031516 A1 | 2/2017 | Sugiyama et al. |
| 2017/0075484 A1 | 3/2017 | Kali et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0115823 A1 | 4/2017 | Huang et al. |
| 2017/0123257 A1 | 5/2017 | Zhao |
| 2017/0131846 A1 | 5/2017 | Edzer et al. |
| 2017/0139541 A1 | 5/2017 | Christiansson et al. |
| 2017/0160871 A1 | 6/2017 | Drumm |
| 2017/0177163 A1 | 6/2017 | Wallander et al. |
| 2017/0185186 A1 | 6/2017 | Liu |
| 2017/0185230 A1 | 6/2017 | Wallander et al. |
| 2017/0185269 A1 | 6/2017 | Antilla et al. |
| 2017/0192493 A1 | 7/2017 | Ofek et al. |
| 2017/0220204 A1 | 8/2017 | Huang et al. |
| 2017/0235537 A1 | 8/2017 | Liu et al. |
| 2017/0249030 A1 | 8/2017 | Park et al. |
| 2017/0264865 A1* | 9/2017 | Huangfu ............. H10K 50/818 |
| 2017/0285789 A1 | 10/2017 | Barel |
| 2017/0344185 A1 | 11/2017 | Ohlsson et al. |
| 2018/0031753 A1 | 2/2018 | Craven-Bartle et al. |
| 2018/0107373 A1 | 4/2018 | Cheng |
| 2018/0129354 A1 | 5/2018 | Christiansson et al. |
| 2018/0136788 A1 | 5/2018 | He et al. |
| 2018/0149792 A1 | 5/2018 | Lee et al. |
| 2018/0205989 A1 | 7/2018 | Srinivasan et al. |
| 2018/0225006 A1 | 8/2018 | Wall |
| 2018/0253187 A1 | 9/2018 | Christiansson et al. |
| 2018/0267672 A1 | 9/2018 | Wassvik et al. |
| 2018/0275788 A1 | 9/2018 | Christiansson et al. |
| 2018/0275830 A1 | 9/2018 | Christiansson et al. |
| 2018/0275831 A1 | 9/2018 | Christiansson et al. |
| 2018/0275836 A1 | 9/2018 | Hermans et al. |
| 2018/0314206 A1 | 11/2018 | Lee et al. |
| 2019/0004668 A1 | 1/2019 | Jeong et al. |
| 2019/0025984 A1 | 1/2019 | Weilbacher et al. |
| 2019/0050074 A1 | 2/2019 | Kocovski |
| 2019/0065030 A1 | 2/2019 | Kang et al. |
| 2019/0107923 A1 | 4/2019 | Drumm |
| 2019/0146630 A1 | 5/2019 | Chen et al. |
| 2019/0155495 A1 | 5/2019 | Klein et al. |
| 2019/0196659 A1 | 6/2019 | Skagmo et al. |
| 2019/0227670 A1 | 7/2019 | O'Cleirigh et al. |
| 2019/0235701 A1 | 8/2019 | Han et al. |
| 2019/0250755 A1 | 8/2019 | Liu et al. |
| 2019/0258353 A1 | 8/2019 | Drumm et al. |
| 2019/0317640 A1 | 10/2019 | Christiansson et al. |
| 2019/0324570 A1 | 10/2019 | Kolundzjia et al. |
| 2019/0377431 A1 | 12/2019 | Drumm |
| 2019/0377435 A1 | 12/2019 | Piot et al. |
| 2020/0012408 A1 | 1/2020 | Drumm et al. |
| 2020/0073509 A1 | 3/2020 | Shih et al. |
| 2020/0098147 A1 | 3/2020 | Ha et al. |
| 2020/0125189 A1 | 4/2020 | Kim et al. |
| 2020/0159382 A1 | 5/2020 | Drumm |
| 2020/0167033 A1 | 5/2020 | Kim et al. |
| 2020/0249777 A1 | 8/2020 | Hou et al. |
| 2020/0310592 A1 | 10/2020 | Bergstrom et al. |
| 2020/0310621 A1 | 10/2020 | Piot et al. |
| 2020/0341587 A1 | 10/2020 | Drumm |
| 2020/0348473 A1 | 11/2020 | Drumm |
| 2020/0387237 A1 | 12/2020 | Drumm |
| 2021/0255662 A1 | 8/2021 | Svensson et al. |
| 2022/0221955 A1 | 7/2022 | Bergstrom et al. |
| 2022/0413652 A1 | 12/2022 | Andersson et al. |
| 2023/0057020 A1 | 2/2023 | Wassvik |
| 2023/0068643 A1 | 3/2023 | Bergstrom et al. |
| 2023/0080260 A1 | 3/2023 | Bergstrom et al. |
| 2023/0082401 A1 | 3/2023 | Andreasson et al. |

FOREIGN PATENT DOCUMENTS

| | | |
|---|---|---|
| CN | 201233592 Y | 5/2009 |
| CN | 101174191 A | 6/2009 |
| CN | 101644854 A | 2/2010 |
| CN | 201437963 U | 4/2010 |
| CN | 201465071 U | 5/2010 |
| CN | 101882034 | 11/2010 |
| CN | 102117155 A | 7/2011 |
| CN | 101019071 B | 6/2012 |
| CN | 101206550 B | 6/2012 |
| CN | 102929449 A | 2/2013 |

(56) References Cited

FOREIGN PATENT DOCUMENTS

| | | | |
|---|---|---|---|
| CN | 202887145 U | 4/2013 | |
| CN | 103123556 A | 5/2013 | |
| CN | 203189466 U | 9/2013 | |
| CN | 203224848 U | 10/2013 | |
| CN | 203453994 U | 2/2014 | |
| CN | 101075168 B | 4/2014 | |
| CN | 102414646 B * | 4/2014 | ........... G06F 3/0412 |
| CN | 203720812 U | 7/2014 | |
| CN | 203786707 U | 8/2014 | |
| CN | 203786708 U | 8/2014 | |
| CN | 203825586 U | 9/2014 | |
| CN | 204288179 U | 4/2015 | |
| CN | 104808843 A | 7/2015 | |
| CN | 205015574 U | 2/2016 | |
| CN | 205384833 U | 7/2016 | |
| CN | 104391611 A | 9/2017 | |
| DE | 3511330 C2 | 5/1988 | |
| DE | 68902419 T2 | 3/1993 | |
| DE | 69000920 T2 | 6/1993 | |
| DE | 19809934 A1 | 9/1999 | |
| DE | 10026201 A1 | 12/2000 | |
| DE | 10025175 A1 | 12/2001 | |
| DE | 102009003990 A1 | 7/2010 | |
| DE | 102010000473 A1 | 8/2010 | |
| EP | 0845812 B1 | 6/1998 | |
| EP | 0600576 B1 | 10/1998 | |
| EP | 0931731 A1 | 7/1999 | |
| EP | 1798630 A2 | 6/2007 | |
| EP | 0897161 B1 | 10/2007 | |
| EP | 2088501 A1 | 8/2009 | |
| EP | 1512989 B1 | 9/2009 | |
| EP | 2077490 A3 | 1/2010 | |
| EP | 1126236 B1 | 12/2010 | |
| EP | 2314203 A1 | 4/2011 | |
| EP | 2325735 A2 | 5/2011 | |
| EP | 2339437 A3 | 10/2011 | |
| EP | 2442180 A1 | 4/2012 | |
| EP | 2466429 A1 | 6/2012 | |
| EP | 2479642 A1 | 7/2012 | |
| EP | 1457870 B1 | 8/2012 | |
| EP | 2565770 A2 | 3/2013 | |
| EP | 2765622 A2 | 8/2014 | |
| EP | 2778849 A1 | 9/2014 | |
| EP | 2840470 | 2/2015 | |
| EP | 2515216 A1 | 3/2016 | |
| EP | 3002666 | 4/2016 | |
| EP | 3535640 A1 | 9/2019 | |
| FR | 2172828 A1 | 10/1973 | |
| FR | 2617619 B1 | 1/1990 | |
| FR | 2614711 B1 | 3/1992 | |
| FR | 2617620 B1 | 9/1992 | |
| FR | 2676275 A1 | 11/1992 | |
| GB | 1380144 A | 1/1975 | |
| GB | 2131544 B | 3/1986 | |
| GB | 2204126 A | 11/1988 | |
| JP | S62159213 A | 7/1987 | |
| JP | H05190066 A | 7/1993 | |
| JP | 2000506655 A | 5/2000 | |
| JP | 2000172438 A | 6/2000 | |
| JP | 2000259334 A | 9/2000 | |
| JP | 2000293311 A | 10/2000 | |
| JP | 2003330603 A | 11/2003 | |
| JP | 2005004278 A | 1/2005 | |
| JP | 2008506173 A | 2/2008 | |
| JP | 2011530124 A | 12/2011 | |
| JP | 2016192688 | 11/2016 | |
| JP | 2015158831 A | 2/2018 | |
| KR | 100359400 | 7/2001 | |
| KR | 100940435 | 2/2010 | |
| KR | 101081586 B1 | 11/2011 | |
| KR | 20150125374 A | 11/2015 | |
| KR | 10-2016-0075643 A | 6/2016 | |
| TW | M517370 U | 2/2016 | |
| WO | WO 1984/003186 A1 | 8/1984 | |
| WO | WO 95/27919 A2 | 10/1995 | |
| WO | WO 1999/046602 A1 | 9/1999 | |
| WO | WO 01/127867 A1 | 4/2001 | |
| WO | WO 01/84251 A2 | 11/2001 | |
| WO | WO 02/35460 A1 | 5/2002 | |
| WO | WO 02/077915 A2 | 10/2002 | |
| WO | WO 02/095668 A1 | 11/2002 | |
| WO | WO 03/076870 A1 | 9/2003 | |
| WO | WO 2004/032210 A2 | 4/2004 | |
| WO | WO 2004/081502 A2 | 9/2004 | |
| WO | WO 2004/081956 A2 | 9/2004 | |
| WO | WO 2005/026938 A2 | 3/2005 | |
| WO | WO 2005/029172 A2 | 3/2005 | |
| WO | WO 2005/029395 A2 | 3/2005 | |
| WO | WO 2005/125011 A1 | 12/2005 | |
| WO | WO 2006/081633 A1 | 8/2006 | |
| WO | WO 2006/095320 A2 | 9/2006 | |
| WO | WO 2006/124551 A2 | 11/2006 | |
| WO | WO 2007/003196 A2 | 1/2007 | |
| WO | WO 2007/047685 | 4/2007 | |
| WO | WO-2007047685 A2 * | 4/2007 | ......... H04N 5/23293 |
| WO | WO 2007/058924 A2 | 5/2007 | |
| WO | WO 2007/112742 A1 | 10/2007 | |
| WO | WO 2008/004103 A2 | 1/2008 | |
| WO | WO 2008/007276 A2 | 1/2008 | |
| WO | WO 2008/017077 A2 | 2/2008 | |
| WO | WO 2008/034184 A1 | 3/2008 | |
| WO | WO 2008/039006 A1 | 4/2008 | |
| WO | WO 2008/044024 | 4/2008 | |
| WO | WO 2008/068607 A2 | 6/2008 | |
| WO | WO 2006/124551 B1 | 7/2008 | |
| WO | WO 2008/017077 A4 | 2/2009 | |
| WO | WO 2009029764 A1 | 3/2009 | |
| WO | WO 2009/048365 A1 | 4/2009 | |
| WO | WO 2009/077962 A2 | 6/2009 | |
| WO | WO 2009/102681 A2 | 8/2009 | |
| WO | WO 2009/137355 A2 | 11/2009 | |
| WO | WO 2010/006882 A2 | 1/2010 | |
| WO | WO 2010/006883 A2 | 1/2010 | |
| WO | WO 2010/006884 A2 | 1/2010 | |
| WO | WO 2010/006885 A2 | 1/2010 | |
| WO | WO 2010/006886 A2 | 1/2010 | |
| WO | WO 2010/015408 A1 | 2/2010 | |
| WO | WO 2010/046539 A1 | 4/2010 | |
| WO | WO 2010/056177 A1 | 5/2010 | |
| WO | WO 2010/064983 A2 | 6/2010 | |
| WO | WO 2010/081702 A2 | 7/2010 | |
| WO | WO 2010/112404 A1 | 10/2010 | |
| WO | WO 2010/123809 A2 | 10/2010 | |
| WO | WO 2010/134865 A1 | 11/2010 | |
| WO | WO 2011/028169 A1 | 3/2011 | |
| WO | WO 2011/028170 A1 | 3/2011 | |
| WO | WO 2011/049511 A1 | 4/2011 | |
| WO | WO 2011/049512 A1 | 4/2011 | |
| WO | WO 2011/049513 A1 | 4/2011 | |
| WO | WO 2011/057572 A1 | 5/2011 | |
| WO | WO 2011/078769 A1 | 6/2011 | |
| WO | WO 2011/082477 A1 | 7/2011 | |
| WO | WO 2011/139213 A1 | 11/2011 | |
| WO | WO 2012/002894 A1 | 1/2012 | |
| WO | WO 2012/010078 A1 | 1/2012 | |
| WO | WO 2012/018176 A2 | 2/2012 | |
| WO | WO 2012/050510 A1 | 4/2012 | |
| WO | WO 2012/082055 A1 | 6/2012 | |
| WO | WO 2012/105893 A1 | 8/2012 | |
| WO | WO 2012/121652 A1 | 9/2012 | |
| WO | WO 2012/158105 A2 | 11/2012 | |
| WO | WO 2012/171181 | 12/2012 | |
| WO | WO 2012/172302 A1 | 12/2012 | |
| WO | WO 2012/176801 A1 | 12/2012 | |
| WO | WO 2013/036192 A1 | 3/2013 | |
| WO | WO 2013/048312 A2 | 4/2013 | |
| WO | WO 2013/055282 A1 | 4/2013 | |
| WO | WO 2013/062471 A2 | 5/2013 | |
| WO | WO 2013/081818 | 6/2013 | |
| WO | WO 2013/089622 A2 | 6/2013 | |
| WO | WO 2013/115710 A2 | 8/2013 | |
| WO | WO 2013/133756 A1 | 9/2013 | |
| WO | WO 2013/133757 A2 | 9/2013 | |
| WO | WO 2013/138003 | 9/2013 | |

(56) References Cited

FOREIGN PATENT DOCUMENTS

| WO | WO 2013/159472 | 10/2013 |
|---|---|---|
| WO | WO 2013/176613 A2 | 11/2013 |
| WO | WO 2013/176614 A2 | 11/2013 |
| WO | WO 2013/176615 A2 | 11/2013 |
| WO | WO 2014/044181 A1 | 3/2014 |
| WO | WO 2014/055809 A1 | 4/2014 |
| WO | WO 2014/065601 | 5/2014 |
| WO | WO 2014/086084 A1 | 6/2014 |
| WO | WO 2014/098742 | 6/2014 |
| WO | WO 2014/098744 A1 | 6/2014 |
| WO | WO 2014/104967 A1 | 7/2014 |
| WO | WO 2014/130515 | 8/2014 |
| WO | WO 2014/131221 | 9/2014 |
| WO | WO 2015/123322 A1 | 8/2015 |
| WO | WO 2015/175586 A1 | 11/2015 |
| WO | WO 2016/130074 A1 | 8/2016 |
| WO | WO 2017/099657 | 6/2017 |
| WO | WO 2017/138863 | 8/2017 |
| WO | WO 2018/096430 A1 | 5/2018 |
| WO | WO 2018/106172 A1 | 6/2018 |
| WO | WO 2018/106176 | 6/2018 |
| WO | WO 2018/141948 | 8/2018 |
| WO | WO 2018/182476 | 10/2018 |
| WO | WO 2019/045629 | 3/2019 |
| WO | WO 2019/156609 | 8/2019 |
| WO | WO 2019/172826 | 9/2019 |
| WO | WO 2019/172827 | 9/2019 |
| WO | WO 2020/022096 | 1/2020 |

OTHER PUBLICATIONS

Kar-Han Tan, Robinson I N, Culbertson B, Apostolopoulos J, 'ConnectBoard: Enable Genuine Eye Contact and Accurate Gaze in Remote Collaboration', In: IEEE Transaction on Multimedia, Jun. 2011, vol. 13, No. 3, ISSN: 1520-9210.

Ahn, Y., et al., "A slim and wide multi-touch tabletop interface and its applications," BigComp2014, IEEE, 2014, in 6 pages.

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: In Free Space and Special Media, Wiley & Sons, 2002, in 57 pages.

International Search Report for International App. No. PCT/SE2017/050102, dated Apr. 5, 2017, in 4 pages.

International Search Report in International Application No. PCT/SE2020/051172 dated Feb. 4, 2021 in 5 pages.

Johnson, M., "Enhanced Optical Touch Input Panel", IBM Technical Disclosure Bulletin, 1985, in 3 pages.

Kak, et al., "Principles of Computerized Tomographic Imaging", Institute of Electrical Engineers, Inc., 1999, in 333 pages.

The Laser Wall, MIT, 1997, http://web.media.mit.edu/"joep/SpectrumWeb/captions/Laser.html.

Liu, J., et al. "Multiple touch points identifying method, involves starting touch screen, driving specific emission tube, and computing and transmitting coordinate of touch points to computer system by direct lines through interface of touch screen," 2007, in 25 pages. Machine translation of KR10-2016-0075643 (Year: 2017).

Natterer, F., "The Mathematics of Computerized Tomography", Society for Industrial and Applied Mathematics, 2001, in 240 pages.

Natterer, F., et al. "Fourier Reconstruction," Mathematical Methods in Image Reconstruction, Society for Industrial and Applied Mathematics, 2001, in 12 pages.

Paradiso, J.A., "Several Sensor Approaches that Retrofit Large Surfaces for Interactivity," ACM Ubicomp 2002 Workshop on Collaboration with Interactive Walls and Tables, 2002, in 8 pages.

Tedaldi, M., et al. "Refractive index mapping of layered samples using optical coherence refractometry," Proceedings of SPIE, vol. 7171, 2009, in 8 pages.

Supplementary European Search Report for European App. No. EP 16759213, dated Oct. 4, 2018, in 9 pages.

Extended European Search Report for European App. No. 16743795.3, dated Sep. 11, 2018, in 5 pages.

International Search Report for International App. No. PCT/SE2017/051224, dated Feb. 23, 2018, in 5 pages.

International Search Report for International App. No. PCT/IB2017/057201, dated Mar. 6, 2018, in 4 pages.

Extended European Search Report in European Application No. 19165019.1, dated Jul. 18, 2019 in 8 pages.

International Preliminary Report on Patentability received in International Application No. PCT/SE2017/051233, dated Jun. 11, 2019, in 6 pages.

International Search Report for International App. No. PCT/SE2018/050070, dated Apr. 25, 2018, in 4 pages.

International Search Report / Written Opinion received in International Application No. PCT/SE2021/051151 dated Jan. 26, 2022, in 13 pages.

Extended European Search Report in European Application No. 17750516.1, dated Jul. 16, 2019 in 5 pages.

Extended European Search Report in European Application No. 16873465.5, date Jun. 25, 2019 in 9 pages.

Report on the Filing or Determination of an Action Regarding a Patent or Trademark. For U.S. Pat. No. 10,282,035, U.S. District of Delaware, dated Dec. 10, 2019, in 1 page.

Civil Cover Sheet Flatfrog *Laboratories Ab v. Promethean Ltd. and Promethean Inc.*, dated Dec. 10, 2019, in 1 page.

Complaint for Patent Infringement, *Flatfrog Laboratories Ab v. Promethean Ltd. and Promethean Inc.*, C.A. No. 19-2246, dated Dec. 10, 2019, in 83 pages.

Executed Summons in a Civil Action to Promethean Inc., C.A. No. 19-2246, dated Dec. 10, 2019 in 2 pages.

Summons in a Civil Action to Promethean Inc., C.A. No. 19-2246, dated Dec. 10, 2019 in 2 pages.

Summons in a Civil Action to Promethean Ltd., C.A. No. 19-2246, dated Dec. 10, 2019 in 2 pages.

Defendants' Answer to Second Amended Complaint and Defendant Promethean Inc.'s Counterclaims Against FlatFrog Laboratories Ab., C.A. No. 19-2246, dated May 22, 2020, in 29 pages.

Extended European Search Report for European App. No. 18772370.5, dated Dec. 9, 2020, in 8 pages.

Extended European Search Report for European App. No. 18772178.2, dated Dec. 10, 2020, in 8 pages.

Extended European Search Report for European App. No. 18774232.5, dated Dec. 21, 2020, in 9 pages.

Defendants' Initial Invalidity Contentions, *Flatfrog Laboratories Ab v. Promethean Ltd. and Promethean Inc.*, C.A. No. 1:19-cv-02246-MN, dated Apr. 23, 2021, in 26 pages.

Notice of Service, *Flatfrog Laboratories Ab v. Promethean Ltd. and Promethean Inc.*, C.A. No. 1:19-cv-02246-MN, dated Apr. 23, 2021, in 2 pages.

Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *Flatfrog Laboratories Ab v. Promethean Ltd. and Promethean Inc.*, C.A. No. 1:19-cv-02246-MN, dated Apr. 23, 2021, in 26 pages.

Exhibit 2: Invalidity Claim Chart Against U.S. Pat. No. 10,775,935 Based on U.S. Patent No. U.S. Pre-Grant Pub. No. 2019/0235701 to Han et al., *Flatfrog Laboratories Ab v. Promethean Ltd. and Promethean Inc.*, C.A. No. 1:19-cv-02246-MN, dated Apr. 23, 2021, in 26 pages.

Exhibit 3A: Invalidity Claim Chart Against U.S. Pat. No. 10,775,935 Based on U.S. Pat. No. 4,751,379 to Sasaki et al., *Flatfrog Laboratories Ab v. Promethean Ltd. and Promethean Inc.*, C.A. No. 1:19-cv-02246-MN, dated Apr. 23, 2021, in 26 pages.

Exhibit 3B: Invalidity Claim Chart Against U.S. Pat. No. 10,775,935 Based on U.S. Pat. No. 4,751,379 to Sasaki et al., *Flatfrog Labo-*

(56) References Cited

OTHER PUBLICATIONS ratories Ab v. Promethean Ltd. and Promethean Inc., C.A. No. 1:19-cv-02246-MN, dated Apr. 23, 2021, in 26 pages.
Exhibit 3C: Invalidity Claim Chart Against U.S. Pat. No. 10,775,935 Based on U.S. Pat. No. 4,751,379 to Sasaki et al., *Flatfrog Laboratories Ab v. Promethean Ltd. and Promethean Inc.*, C.A. No. 1:19-cv-02246-MN, dated Apr. 23, 2021, in 26 pages.
Exhibit 4A: Invalidity Claim Chart Against U.S. Pat. No. 10,775,935 Based on U.S. Pre-Grant Pub. No. 2019/0004668 to Jeong et al., *Flatfrog Laboratories Ab v. Promethean Ltd. and Promethean Inc.*, C.A. No. 1:19-cv-02246-MN, dated Apr. 23, 2021, in 26 pages.
Exhibit 4B: Invalidity Claim Chart Against U.S. Pat. No. 10,775,935 Based on U.S. Pre-Grant Pub. No. 2019/0004668 to Jeong et al., *Flatfrog Laboratories Ab v. Promethean Ltd. and Promethean Inc.*, C.A. No. 1:19-cv-02246-MN, dated Apr. 23, 2021, in 26 pages.
Exhibit 4C: Invalidity Claim Chart Against U.S. Pat. No. 10,775,935 Based on U.S. Pre-Grant Pub. No. 2019/0004668 to Jeong et al., *Flatfrog Laboratories Ab v. Promethean Ltd. and Promethean Inc.*, C.A. No. 1:19-cv-02246-MN, dated Apr. 23, 2021, in 26 pages.
Exhibit 5A: Invalidity Claim Chart Against U.S. Pat. No. 10,775,935 Based on U.S. Pat. No. 9,983,626 to Cao et al., *Flatfrog Laboratories Ab v. Promethean Ltd. and Promethean Inc.*, C.A. No. 1:19-cv-02246-MN, dated Apr. 23, 2021, in 26 pages.
Exhibit 5B: Invalidity Claim Chart Against U.S. Pat. No. 10,775,935 Based on U.S. Pat. No. 9,983,626 to Cao et al., *Flatfrog Laboratories Ab v. Promethean Ltd. and Promethean Inc.*, C.A. No. 1:19-cv-02246-MN, dated Apr. 23, 2021, in 26 pages.
Exhibit 5C: Invalidity Claim Chart Against U.S. Pat. No. 10,775,935 Based on U.S. Pat. No. 9,983,626 to Cao et al., *Flatfrog Laboratories Ab v. Promethean Ltd. and Promethean Inc.*, C.A. No. 1:19-cv-02246-MN, dated Apr. 23, 2021, in 26 pages.
Exhibit 6A: Invalidity Claim Chart Against U.S. Pat. No. 10,775,935 Based on U.S. Pre-Grant Pub. No. 2019/0025984 to Weilbacher et al., *Flatfrog Laboratories Ab v. Promethean Ltd. and Promethean Inc.*, C.A. No. 1:19-cv-02246-MN, dated Apr. 23, 2021, in 26 pages.
Exhibit 6B: Invalidity Claim Chart Against U.S. Pat. No. 10,775,935 Based on U.S. Pre-Grant Pub. No. 2019/0025984 to Weilbacher et al., *Flatfrog Laboratories Ab v. Promethean Ltd. and Promethean Inc.*, C.A. No. 1:19-cv-02246-MN, dated Apr. 23, 2021, in 26 pages.
Exhibit 6C: Invalidity Claim Chart Against U.S. Pat. No. 10,775,935 Based on U.S. Pre-Grant Pub. No. 2019/0025984 to Weilbacher et al., *Flatfrog Laboratories Ab v. Promethean Ltd. and Promethean Inc.*, C.A. No. 1:19-cv-02246-MN, dated Apr. 23, 2021, in 26 pages.
Exhibit 7A: Invalidity Claim Chart Against U.S. Pat. No. 10,775,935 Based on U.S. Pat. No. 9,207,800 to Eriksson et al., *Flatfrog Laboratories Ab v. Promethean Ltd. and Promethean Inc.*, C.A. No. 1:19-cv-02246-MN, dated Apr. 23, 2021, in 26 pages.
Exhibit 7B: Invalidity Claim Chart Against U.S. Pat. No. 10,775,935 Based on U.S. Pat. No. 9,207,800 to Eriksson et al., *Flatfrog Laboratories Ab v. Promethean Ltd. and Promethean Inc.*, C.A. No. 1:19-cv-02246-MN, dated Apr. 23, 2021, in 26 pages.
Exhibit 7C: Invalidity Claim Chart Against U.S. Pat. No. 10,775,935 Based on U.S. Pat. No. 9,207,800 to Eriksson et al., *Flatfrog Laboratories Ab v. Promethean Ltd. and Promethean Inc.*, C.A. No. 1:19-cv-02246-MN, dated Apr. 23, 2021, in 26 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories Ab v. Promethean Ltd. and Promethean Inc.*, C.A. No. 1:19-cv-02246-MN, dated Apr. 23, 2021, in 26 pages.
Exhibit 9: Invalidity Claim Chart Against U.S. Pat. No. 10,739,916 Based on Chinese Utility ModelNo. CN 203786707 U to Chen et al., *Flatfrog Laboratories Ab v. Promethean Ltd. and Promethean Inc.*, C.A. No. 1:19-cv-02246-MN, dated Apr. 23, 2021, in 26 pages.
Exhibit 10: Invalidity Claim Chart Against U.S. Pat. No. 10,739,916 Based on International App. Pub.No. WO2014131221 to Chen et al., *Flatfrog Laboratories Ab v. Promethean Ltd. and Promethean Inc.*, C.A. No. 1:19-cv-02246-MN, dated Apr. 23, 2021, in 26 pages.
Exhibit 11: Invalidity Claim Chart Against U.S. Pat. No. 10,739,916 Based on Chinese Pub. App. No.104391611 A to Hu et al., *Flatfrog Laboratories Ab v. Promethean Ltd. and Promethean Inc.*, C.A. No. 1:19-cv-02246-MN, dated Apr. 23, 2021, in 26 pages.
Exhibit 12: Invalidity Claim Chart Against U.S. Pat. No. 10,739,916 Based on Chinese Utility ModelNo. 203786708 U to Cao, *Flatfrog Laboratories Ab v. Promethean Ltd. and Promethean Inc.*, C.A. No. 1:19-cv-02246-MN, dated Apr. 23, 2021, in 26 pages.
Exhibit 13: Invalidity Claim Chart Against U.S. Pat. No. 10,739,916 Based on Chinese Utility ModelNo. 204288179 U to Mo et al., *Flatfrog Laboratories Ab v. Promethean Ltd. and Promethean Inc.*, C.A. No. 1:19-cv-02246-MN, dated Apr. 23, 2021, in 26 pages.
Defendants Promethean Ltd. and Promethean Inc.'s Preliminary Proposed Claim Constructions, *Flatfrog Laboratories Ab v. Promethean Ltd. and Promethean Inc.*, C.A. No. 1:19-cv-02246-MN, dated May 24, 2021, in 8 pages.
Defendants' Sur-Reply Claim Construction Brief, *Flatfrog Laboratories Ab v. Promethean Ltd. and Promethean Inc.*, C.A. No. 1:19-cv-02246-MN, dated Sep. 13, 2021, in 24 pages.
ASTM International, "Standard Specification for Heat-Treated Flat Glass-Kind HS, Kind FT Coated and Uncoated Glass," Designation: C 1048-04, in 7 pages.
British Standard, "Glass in building—Thermally toughened soda lime silicate safety glass," EN 12150-1:2000, ISBN 0 580 36171 3, Aug. 15, 2000, in 28 pages.
Joint Claim Construction Brief, *Flatfrog Laboratories Ab v. Promethean Ltd. and Promethean Inc.*, C.A. No. 1:19-cv-02246-MN, dated Sep. 20, 2021, in 92 pages.
Joint Appendix of Exhibits to Joint Claim Construction Brief, *Flatfrog Laboratories Ab v. Promethean Ltd. and Promethean Inc.*, C.A. No. 1:19-cv-02246-MN, dated Sep. 20, 2021, in 383 pages, (uploaded in 4 parts, part 1 of 4).
Joint Appendix of Exhibits to Joint Claim Construction Brief, *Flatfrog Laboratories Ab v. Promethean Ltd. and Promethean Inc.*, C.A. No. 1:19-cv-02246-MN, dated Sep. 20, 2021, in 383 pages, (uploaded in 4 parts, part 2 of 4).
Joint Appendix of Exhibits to Joint Claim Construction Brief, *Flatfrog Laboratories Ab v. Promethean Ltd. and Promethean Inc.*, C.A. No. 1:19-cv-02246-MN, dated Sep. 20, 2021, in 383 pages, (uploaded in 4 parts, part 3 of 4).
Joint Appendix of Exhibits to Joint Claim Construction Brief, *Flatfrog Laboratories Ab v. Promethean Ltd. and Promethean Inc.*, C.A. No. 1:19-cv-02246-MN, dated Sep. 20, 2021, in 383 pages, (uploaded in 4 parts, part 4 of 4).
International Search Report in PCT/SE2019/050189 dated May 29, 2019 in 4 pages.
International Search Report for International App. No. PCT/SE2019/050953, dated Nov. 26, 2019, in 4 pages.
International Search Report for International App. No. PCT/SE2020/050504, dated Apr. 9, 2020, in 4 pages.
International Search Report in App. No. PCT/SE2020/051117 dated Feb. 5, 2021 in 2 pages.
International Search Report in International Application No. PCT/SE2021/050040 dated May 10, 2021 in 3 pages.
International Search Report in International App. No. PCT/SE2021/050086 dated Feb. 26, 2021 in 5 pages.
International Search Report in International Application No. PCT/SE2021/050095 dated Jun. 2, 2021 in 6 pages.
International Search Report / Written Opinion of the International Searching Authority for PCT/SE2021/051018, dated Feb. 1, 2022, in 10 pages.

\* cited by examiner

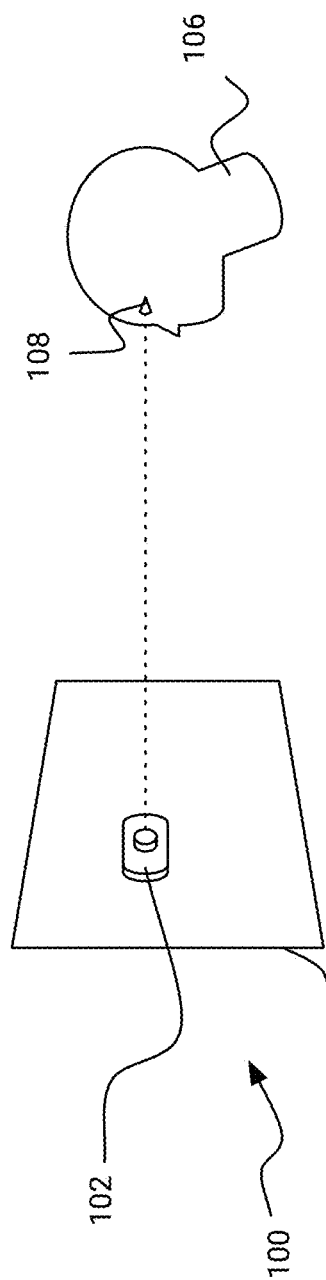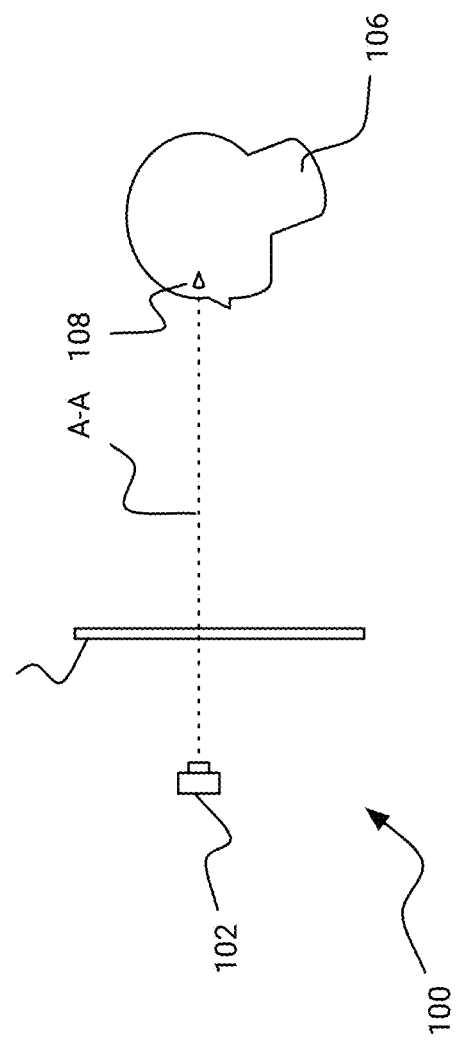
Figure 1a
Figure 1b

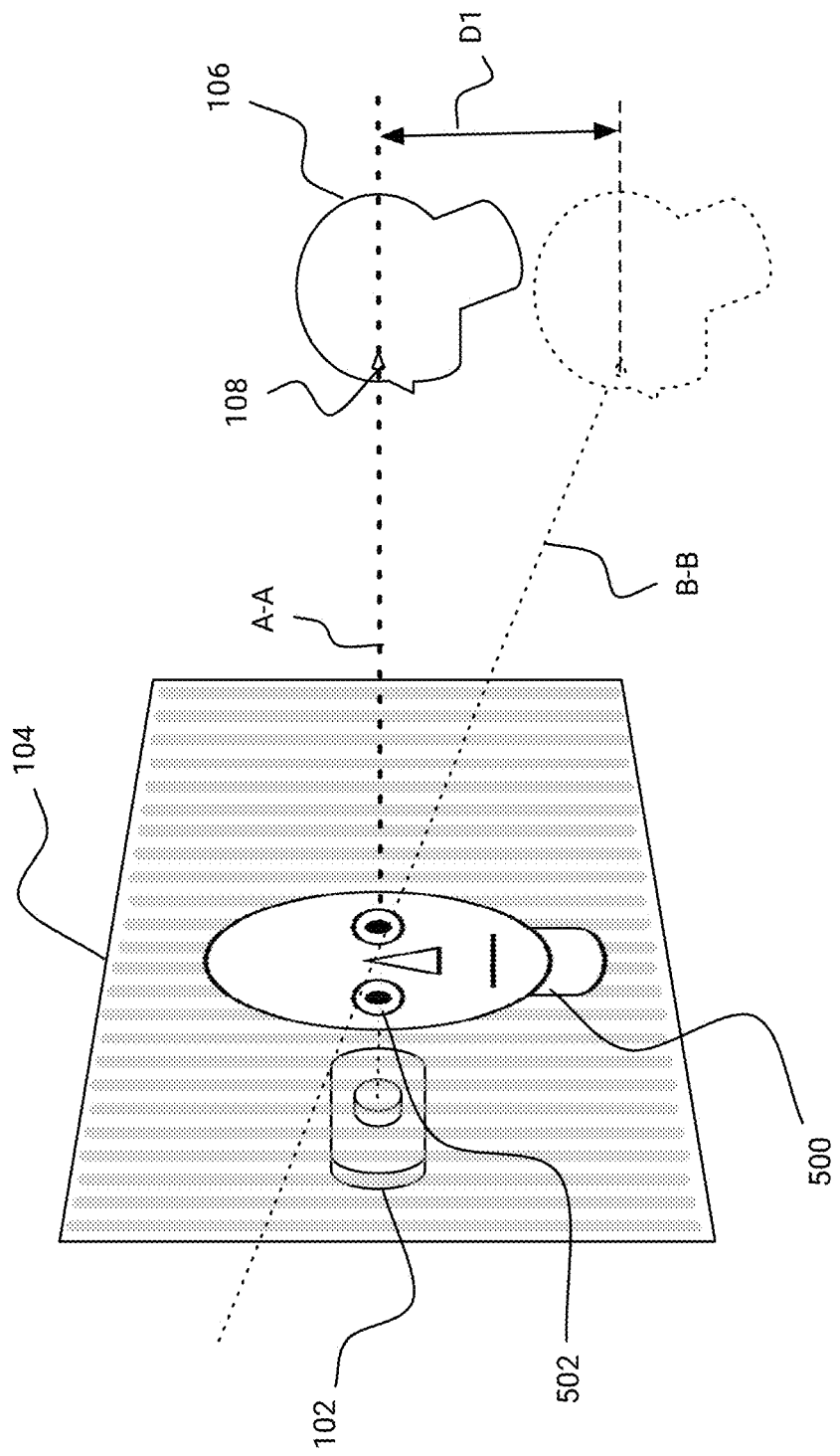

VIDEOCONFERENCING TERMINAL AND METHOD OF OPERATING THE SAME

The present invention relates to a videoconferencing terminal and method of operating the same.

Today in the business environment there is an increasing demand not to travel and face to face meetings are being replaced with alternatives such as videoconferencing. However, one problem with videoconferencing is that making eye contact with the remote user may not be possible if the camera for the videoconferencing terminal is located adjacent to display screen. In this way, the local user looks at the remote user on the display screen, but the local user will not be looking directly at the camera. This can mean the eye contact is not maintained and this can be distracting to the users and reduce the efficacy of videoconferencing as a viable alternative to face to face meetings.

One known arrangement is discussed in US2012/0257004 which discloses mounting the camera behind a transparent display screen on a mechanism for moving the position of the camera. The camera is then moved with respect to the position of the local user to maintain eye contact with the camera. A problem with this arrangement is that additional mechanical components are required to enable moving the position of the camera. This means the videoconferencing terminal is usually dedicated to a specific room because setup is time consuming and complex. Furthermore, movement of the camera during a videoconference call may distract the local user if the mechanism is actuated and makes a sound.

Another known solution is discussed in US2009/0278913 which discloses moving the displayed image of the remote user's face until it is aligned with the axis of the camera behind the screen. A problem with this arrangement is that the local user may be looking at the displayed image but still not make direct eye contact with the camera and the remote user due to parallax error.

Embodiments of the present invention aim to address the aforementioned problems.

According to a first aspect of the present invention there is a method of videoconferencing comprising: displaying an image of a remote user on a display; capturing an image of a local user at a user position in front of the display, with at least one camera being located at a camera position behind the display; and modifying an image to be displayed based on the camera position of the at least one camera with respect to the display and based on the user position of the local user with respect to the display.

Optionally the method comprises determining a position of the eyes of the local user with respect to the display.

Optionally the method comprises determining an axis of the at least one camera based on the position of the eyes of the local user.

Optionally the method comprises determining a position of the eyes of the remote user with respect to the display.

Optionally the method comprises determining an offset between the axis of the camera and the eyes of the remote user in a displayed image.

Optionally the modifying comprises translating the image to be displayed such that the displayed eyes of the remote user intersect with the axis.

Optionally the method comprises determining one or more pixel artifacts captured by the at least one camera from the display.

Optionally method comprises compensating the captured camera image to remove the determined one or more pixel artifacts.

Optionally the method comprises determining one or more occlusion artifacts from one or more display elements.

Optionally the method comprises compensating the captured camera image to remove the one or more occlusion artifacts.

Optionally the occluding display elements are out of focus.

Optionally the user position of the user and/or the camera position of the at least one camera is moveable with respect to the display.

Optionally the at least one camera is one or more of the following: an RGB camera or an infrared camera.

Optionally the display is transmissive to electromagnetic radiation.

Optionally one or more of the steps is carried out during calibration and/or one or more of the steps is carried out during operation.

According to a second aspect of the present invention there is a videoconferencing terminal comprising: a display for displaying an image of a remote user; at least one camera for capturing an image of a local user at a user position in front of the display, the camera being located at a camera position behind the display; and a controller configured to modify an image to be displayed based on the camera position of the at least one camera with respect to the display and based on the user position of the local user with respect to the display.

According to a third aspect of the present invention there is a method of videoconferencing comprising: displaying an image of a remote user on a display; capturing an image of a local user at a user position in front of the display, with at least one camera being located at a camera position behind the display; and modifying an image to be displayed based on the camera position of the at least one camera with respect to the display.

According to a fourth aspect of the present invention there is a videoconferencing terminal comprising: a display for displaying an image of a remote user; at least one camera for capturing an image of a local user at a user position in front of the display, the camera being located at a camera position behind the display; and a controller configured to modify an image to be displayed based on the camera position of the at least one camera with respect to the display.

Various other aspects and further embodiments are also described in the following detailed description and in the attached claims with reference to the accompanying drawings, in which:

FIG. 1a shows a schematic perspective view of a videoconferencing terminal;

FIG. 1b shows a schematic side view of a videoconferencing terminal;

Figure 4A:
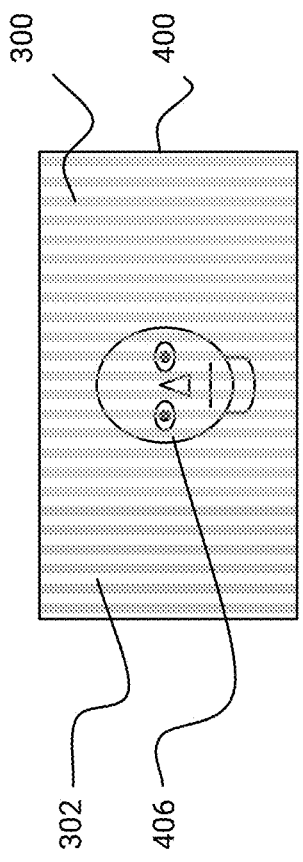
Figure 4B:
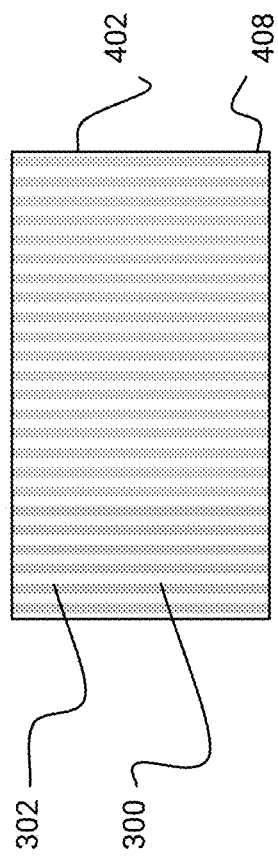
Figure 4C:
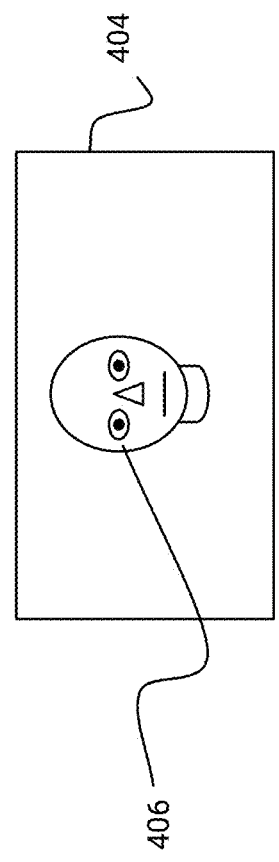
Figure 6:
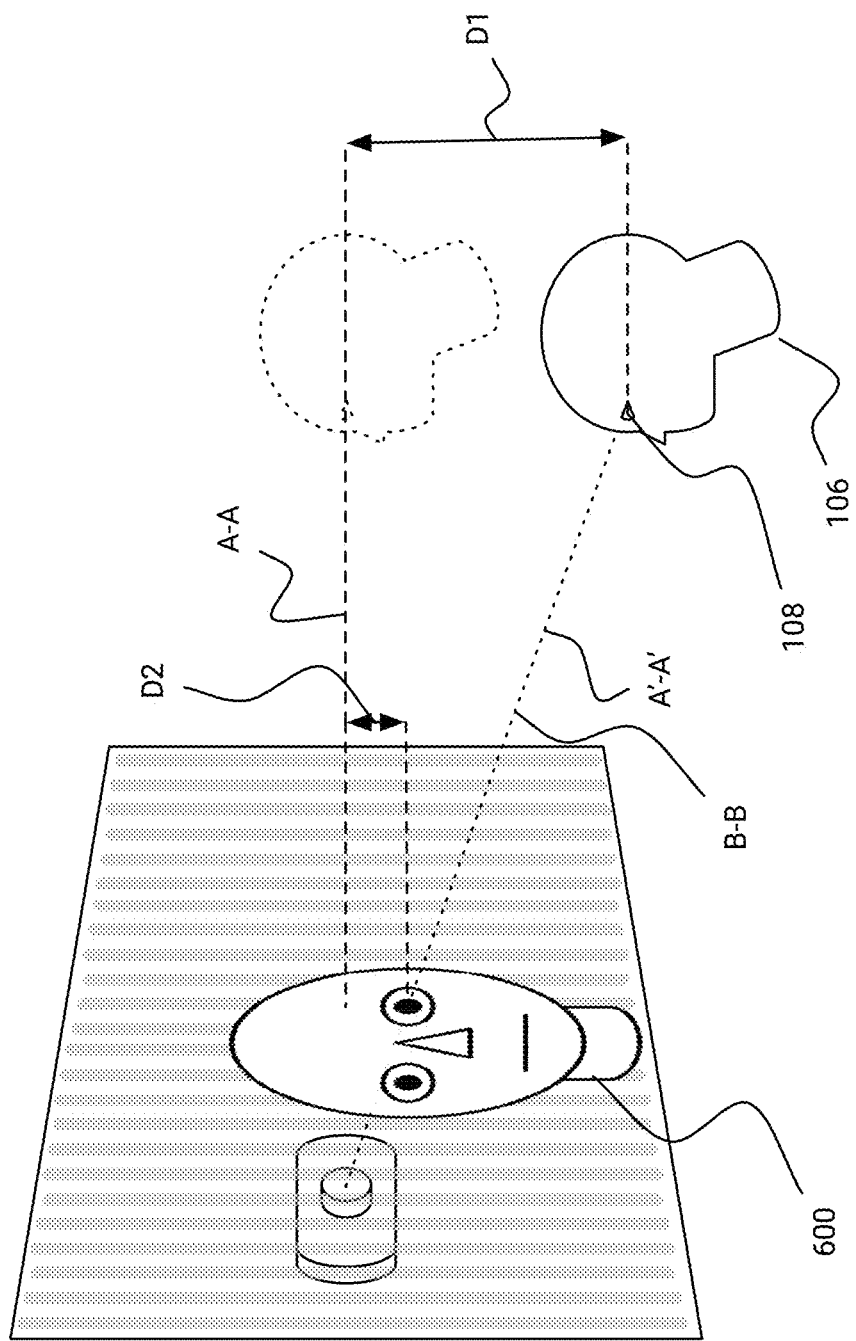
Figure 7:
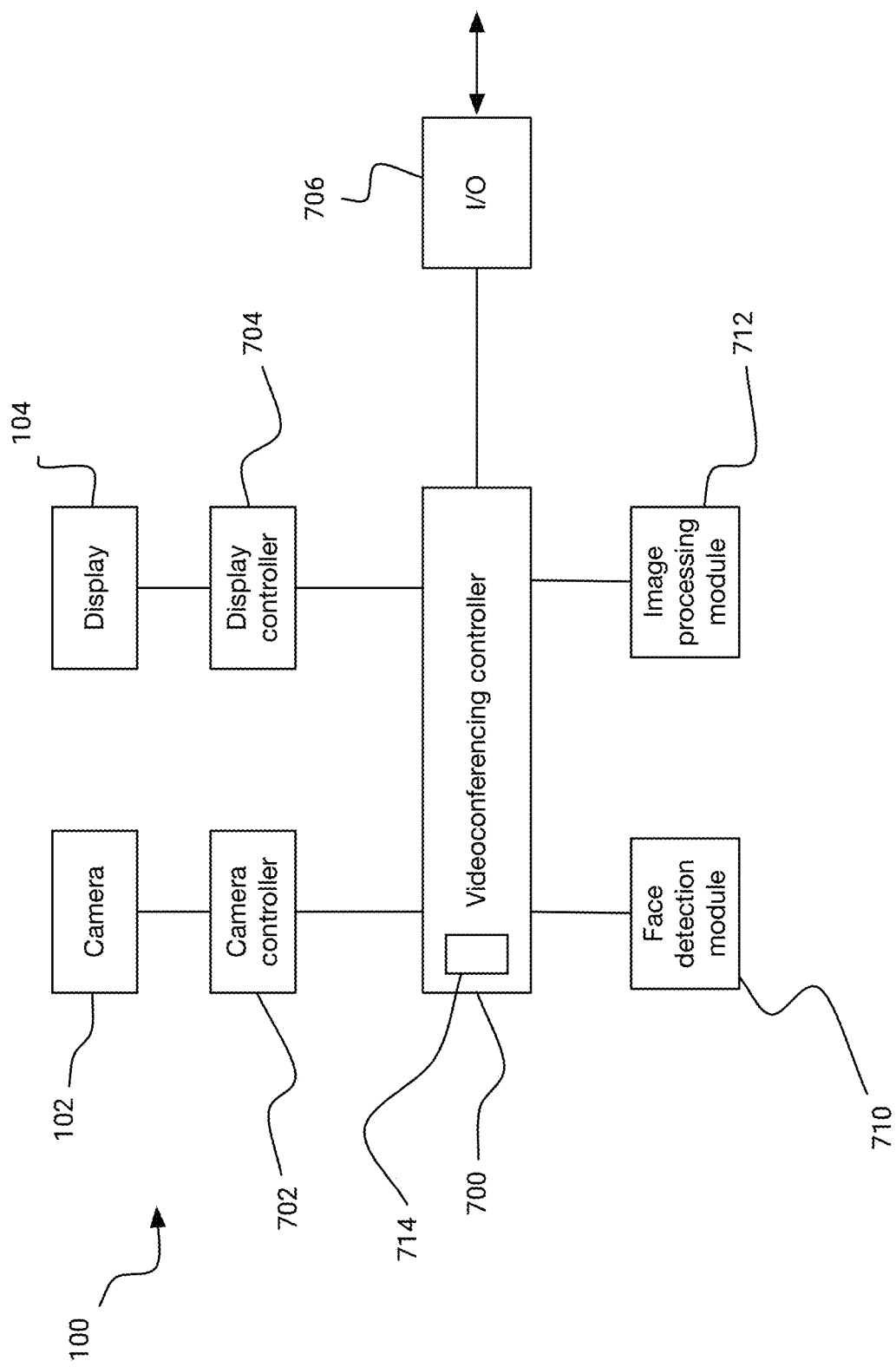
Figure 8:
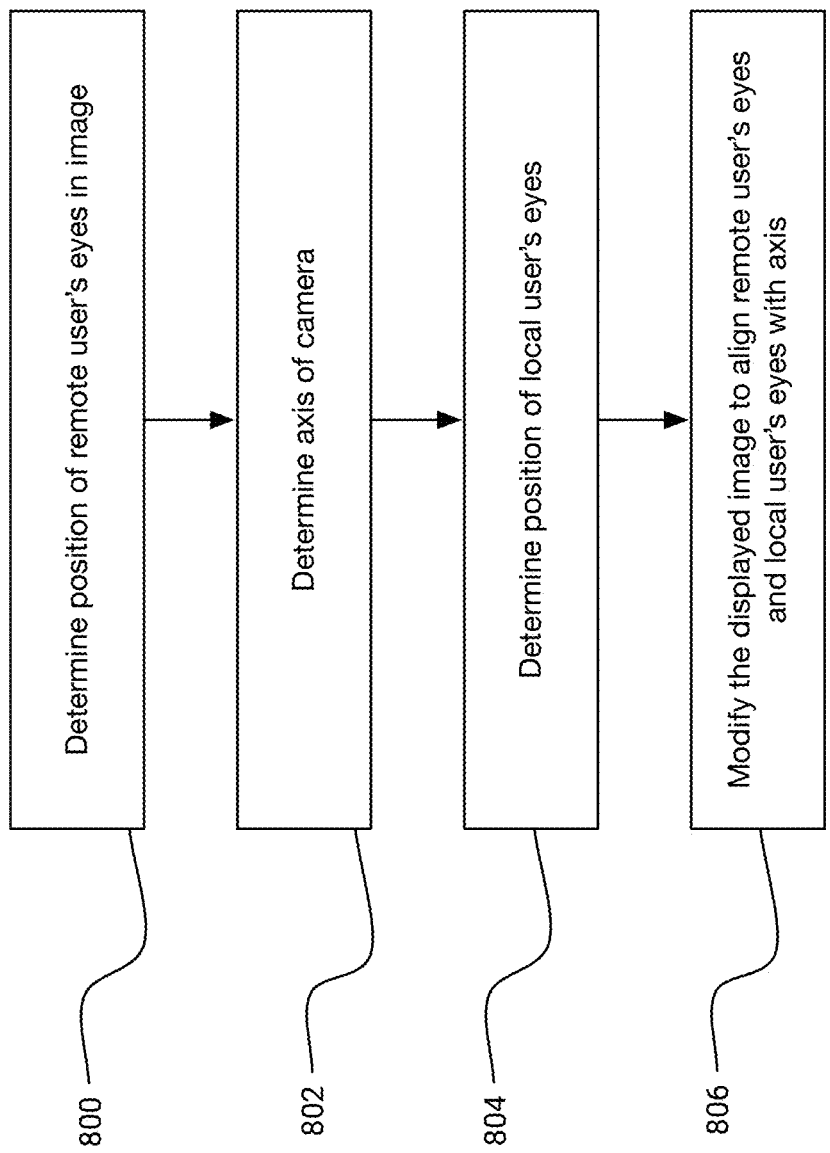
Figure 9:
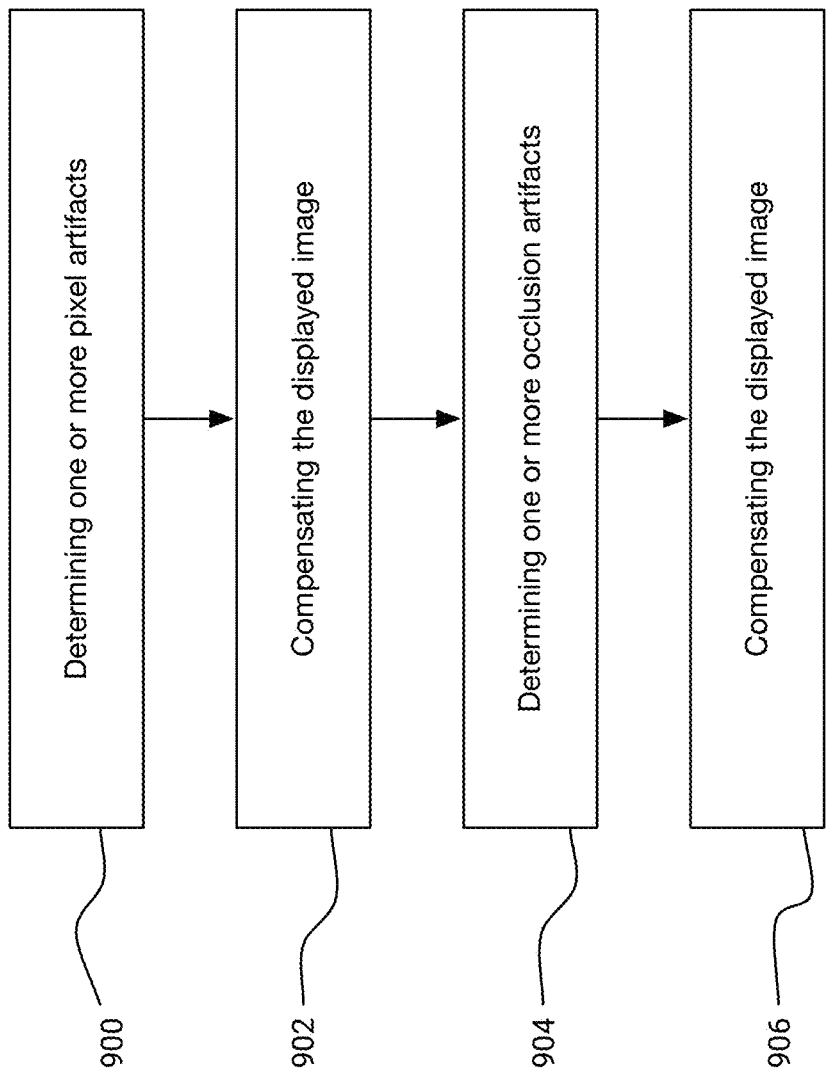

FIGS. 4a, 4b, and 4c show a schematic view of a captured image by a videoconferencing terminal;

FIG. 5 shows a schematic perspective view of a videoconferencing terminal;

FIG. 6 shows a schematic perspective view of a videoconferencing terminal;

FIG. 7 shows a schematic view of a videoconferencing terminal;

FIG. 8 shows a flow diagram of the operation of a videoconferencing terminal; and FIG. 9 shows a flow diagram of the operation of a videoconferencing terminal.

FIG. 1a shows a perspective view of a schematic perspective view of a videoconferencing terminal 100. The videoconferencing terminal 100 comprises at least one camera 102 positioned behind a display 104. The display 104 is configured to display an image 500 of a remote user to a local user 106 who is positioned in front of the display 104.

The local user 106 is positioned in close proximity to the videoconferencing terminal 100 and the camera 102 is configured to capture on or more images, and or videos of the local user 106. For example, the local user 106 is in the same room as the videoconferencing terminal 100. In contrast, the remote user is not in close proximity to the videoconferencing terminal 100 or the local user 106 and the video stream and/or images of the local user 106 are transmitted to a videoconferencing terminal (not shown) associated with the remote user.

In the embodiments described with reference to the Figures there are two users a local user 106 and a remote user. In other embodiments (not shown), there may be any number of local users 106 and remote users on the videoconference call.

The process of receiving and transmitting video and image data between videoconferencing terminals 100 is carried out with respect to known techniques and will not be discussed in any further detail.

In some embodiments, the remote user has an identical videoconferencing terminal 100 to the videoconferencing terminal 100 of the local user 106. However, this is not necessary and only one of the users participating in the videoconference can have the videoconferencing terminal 100 according to the embodiments described in reference to the Figures. In a preferred embodiment, all users participating in the videoconference have a videoconferencing terminal 100 according to the embodiments.

FIG. 1b shows a schematic side view of a videoconferencing terminal 100. The camera 102 comprises an axis A-A which is in some embodiments arranged substantially perpendicular to the plane of the surface of the display 104. FIG. 1b shows that the axis A-A is in alignment with the eyes 108 of the local user 106. In this way, axis A-A is an "eye-contact" axis. In this arrangement, the local user 106 is looking directly along the axis of the camera 102. This means that the camera 102 will capture an image or a video of the local user 106 looking directly at the camera 102. This means the remote user will receive an image of the local user 106 with the eyes 108 of the local user in the correct direction to simulate a face to face meeting. In some alternative embodiments, the camera 102 is moveable with respect to the display 104 and the axis of the camera 102 can be positioned at an angle with respect to the plane of the display 104.

Whilst FIGS. 1a and 1b show one camera 102, in some embodiments there can be a plurality of cameras 102 for capturing and image or a video of a plurality of local users 106 or for capturing an image of a video of a large room. The embodiments described hereinafter are only described in reference to using one camera, but some embodiments use a plurality of cameras 102 are used instead. The camera 102 as shown in FIG. 1 is static and positioned in the centre of the display 104. However, in some embodiments, the camera 102 is moveable with respect to the display 104.

The display 104 in some embodiments is a transparent OLED display 104. The display 104 is substantially planar and can be any suitable size for the videoconferencing call. In other embodiments any other suitable transparent display can be used. For example, infrared cameras (not shown) can be used and the infrared cameras can see the local user 106 through the display 104. In this way, the display 104 is transmissive to electromagnetic radiation which can be in the visible spectrum, near visible, infrared or ultraviolet or any other suitable frequency of electromagnetic radiation.

Turning to FIG. 7, the videoconferencing terminal 100 will be described in further detail. FIG. 7 shows a schematic view of a videoconferencing terminal 100 according to some embodiments.

As previously mentioned, the videoconferencing terminal 100 comprises a camera 102 and a display 104. The videoconferencing terminal 100 selectively controls the activation of the camera 102 and the display 104. As shown in FIG. 7, the camera 102 and the display 104 are controlled by a camera controller 702 and a display controller 704 respectively.

The videoconferencing terminal 100 comprises a videoconferencing controller 700. The videoconferencing controller 700, the camera controller 702 and the display controller 704 may be configured as separate units, or they may be incorporated in a single unit.

The videoconferencing controller 700 comprises a plurality of modules for processing the videos and images received from a remotely from an interface 706 and videos and images captured locally. The interface 706 and the method of transmitted and receiving videoconferencing data is known and will not be discussed any further. In some embodiments, the videoconferencing controller 700 comprises a face detection module 710 for detecting facial features and an image processing module 712 for modifying an image to be displayed on the display 104. The face detection module 710 and the image processing module 712 will be discussed in further detail below.

One or all of the videoconferencing controller 700, the camera controller 702 and the display controller 704 may be at least partially implemented by software executed by a processing unit 714. The face detection modules 710 and the image processing modules 712 may be configured as separate units, or they may be incorporated in a single unit. One or both of the modules 710, 712 may be at least partially implemented by software executed by the processing unit 714.

The processing unit 714 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit 714 may serve as one element/means when executing one instruction but serve as another element/means when executing another instruction. In addition, one element/means may be implemented by one instruction in some cases, but by a plurality of instructions in some other cases. Naturally, it is conceivable that one or more elements (means) are implemented entirely by analogue hardware components.

The processing unit 714 may include one or more processing units, e.g. a CPU ("Central Processing Unit"), a DSP ("Digital Signal Processor"), an ASIC ("Application-Specific Integrated Circuit"), discrete analogue and/or digital components, or some other programmable logical device, such as an FPGA ("Field Programmable Gate Array"). The processing unit 714 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software and associated control parameter values may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The processing unit 714 may include one or more communication interfaces, such as a serial interface, a parallel interface, a USB interface, a wireless interface, a network adapter, etc, as well as one or more data acquisition devices, such as an A/D converter. The special-purpose software may be provided to the processing unit 714 on any suitable computer-readable medium, including a record medium, and a read-only memory.

FIGS. 1a and 1b show the videoconferencing terminal 100 which is operating optimally and the remote user and the local user 106 can make eye contact. However, calibration of the videoconferencing terminal 100 and dynamic modification of the displayed image 500 may be required in order for the local user 106 to experience a good connected feel during a video conference call.

Figure 2:
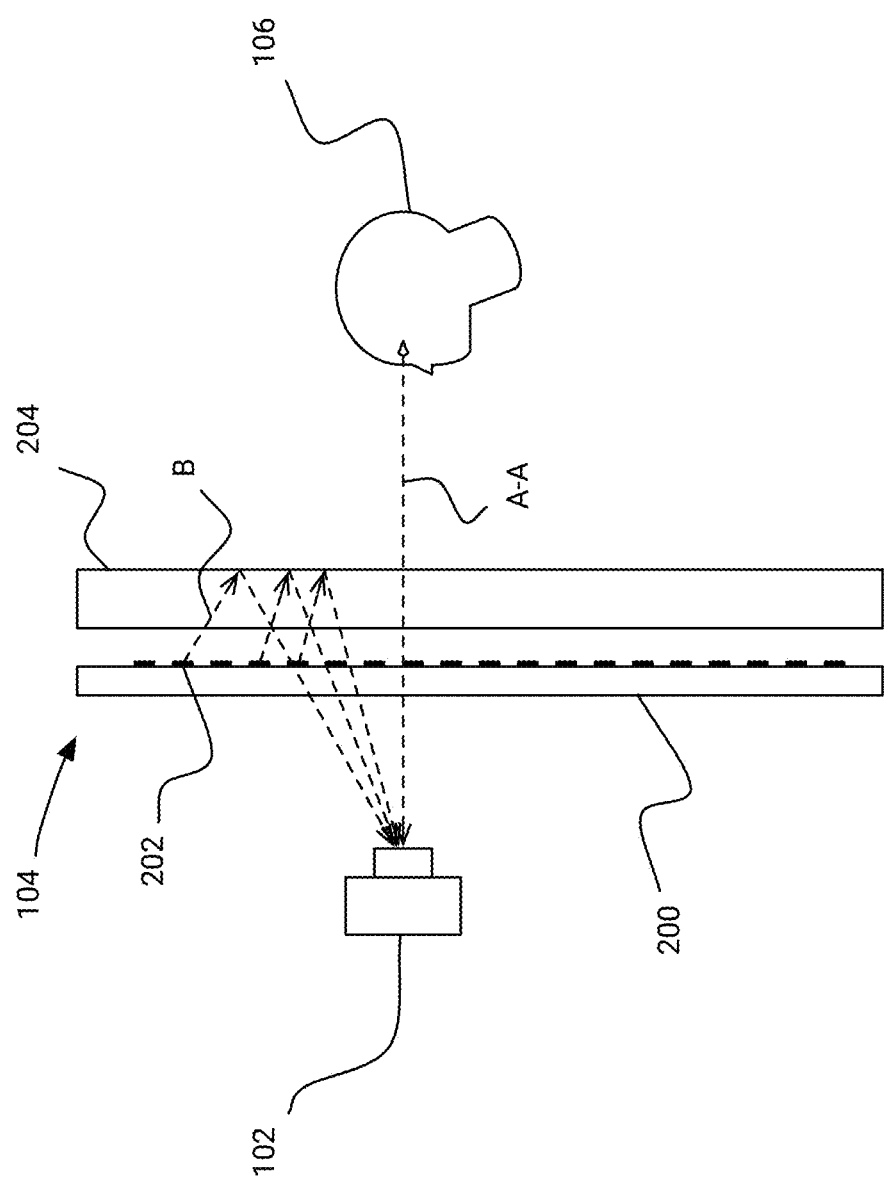
FIG. 2 shows a schematic cross-sectional side view of a videoconferencing terminal.
Figure 3:
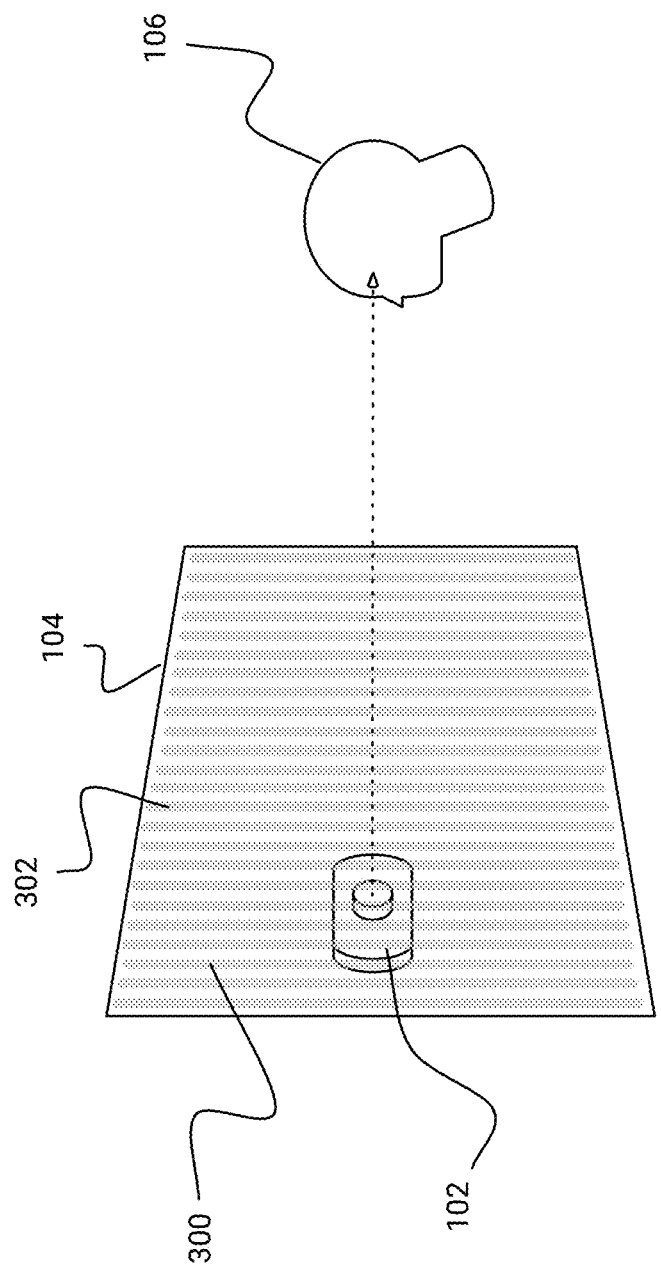
FIG. 3 shows a schematic perspective view of a videoconferencing terminal.

Calibration of the videoconferencing terminal 100 will now be discussed in reference to FIGS. 2, 3, 4a, 4b, 4c and 9. FIG. 2 shows a schematic cross-sectional side view of a videoconferencing terminal. FIG. 3 shows a schematic perspective view of a videoconferencing terminal. FIG. 4a, 4b, and 4c show a schematic view of a processing sequence for a captured camera image 400 on the videoconferencing terminal 100. FIG. 9 shows a flow diagram of the operation of a videoconferencing terminal.

During operation of the camera 102 and the display 104 the videoconferencing controller 700 can optionally interleave operation of the camera 102 and the display 104. In this way, the camera 102 and the display 104 sequentially operate so that the camera 102 captures an image of the local user 106 when the display 104 is off. Likewise, the camera 102 is not capturing an image when the display 106 is displaying an image. For example, the camera 102 can be turned off or the shutter is closed when not capturing an image of the local user 106. This means that the camera 102 takes an image when the display 104 is dark. As mentioned previously, in some embodiments the display is an OLED display. The OLED display has a low persistence, and this reduces pixel artifacts 300 which are received and captured by the camera 102 originating from the display 104.

However, the camera 102 may still receive light from pixel artifacts 300 from the display 104. This can be a function of the display image 500 being displayed on the display 104 as well as the properties of the display 104 itself. Turning to FIG. 2, the display 104 will be described in further detail. The display 104 comprises an LED matrix 200 of selectively operable pixels 202. For the purposes of clarity, only one pixel 202 has been labelled in FIG. 2. The LED matrix 200 can comprise any number of pixels 202 to achieve the required resolution for the videoconferencing call. An optically transmissive cover 204 such as a glass sheet, a transparent film or another clear medium is placed over the LED matrix 200. In some circumstances, one or more light rays B can be reflected back from the optically transmissive cover 204 towards the camera 102.

In some embodiments, the videoconferencing controller 700 is configured to determine one or more pixel artifacts 300 captured by the at least one camera 102 from the display 104 as shown in 900 of FIG. 9. Once the pixel artifacts 300 have been determined, the videoconferencing controller 700 is configured to compensate the captured camera image 400 to remove the mapped one or more pixel artifacts 300. FIG. 3 shows a perspective schematic representation of the video conferencing terminal 100. The display 104 is shown with exemplary pixel artifacts 300 and occlusion artifacts 302 on the display 104. FIG. 4a shows the captured camera image 400 including a local user captured image 406 of the local user 106 together with the pixel artifacts 300 and/or occlusion artifacts 302. Whilst the pixel artifacts 300 and occlusion artifacts 302 are represented by a series of vertical lines, the pixel artifacts 300 and occlusion artifacts 302 can be any distribution across the display 104.

In some embodiments, in order to compensate for the pixel artifacts 300 from the display 104 in the captured camera image 400, the contribution from each pixel 202 of the display 104 in the captured camera image 400 is determined as shown in step 900. Optionally, this is achieved with per-pixel information of the LED matrix 200 which maps the pixel output to the contribution as a pixel artifact map 402 in the captured camera image 400.

The pixel output is a function of the digital RGB (red green blue) colour output of the display image 500 and properties of the display 104. The videoconferencing controller 700 uses information relating to displayed image 500 and the display 104 properties and determines each display pixel's contribution in the captured camera image 400. In this way, the videoconferencing controller 700 determines a pixel artefact map 402 as shown in FIG. 4b.

The videoconferencing controller 700 then subtracts the contribution of all display pixels 202 in the pixel artifact map 402 to obtain a compensated camera image 404 as shown in FIG. 4c and step 902 of FIG. 9. The videoconferencing controller 700 then determines the compensated camera image 404 as it would have looked without any light contribution of pixel artifacts 300 from the pixels 202. The compensated camera image 404 comprises the local user captured image 406 as well.

The videoconferencing controller 700 receives information relating to the digital RGB colours of the display image 500 sent to the display 104. This means that the information relating to the digital RGB colours are directly available to the videoconferencing controller 700 for carrying out the compensation algorithm as shown in FIG. 9.

In some embodiments, the videoconferencing controller 700 optionally determines the display 104 properties can be determined in a calibration step. In the calibration step the videoconferencing controller 700 selectively controls the LED matrix 200 to light up each pixel 202 individually, at different illumination levels, to learn the mapping from digital RGB colour output to contribution in the captured camera image 400.

After the display pixel artifacts 300 have been removed, in some circumstances the captured camera image 400 may still have occlusion artifacts 302 in the captured camera image 400 from elements of the display 104. The occlusion artifacts 302 arise from one or more elements of the display 104 in front of the camera 102 which blocks light from the local user 106. The occlusion artifacts 302 can be described as having an occlusion factor between 0.0 and 1.0 wherein 0.0 indicates total occlusion and 1.0 indicates no occlusion.

In some embodiments, the videoconferencing controller 700 determines the occlusion factors of the occlusion artifacts 302 in a calibration step, when the camera 102 is directed at a uniform (e.g., all white) and evenly illuminated target. This means that the camera image pixel levels are uniform if no occlusions artifacts 302 are present.

FIG. 4b also represents the determined occlusion artifact map 408 of occlusion artifacts 302 on the display occluded image after the calibration step. As mentioned above, in the calibration step the camera 102 is looking at a smooth white surface. The videoconferencing controller 700 determines the maximum pixel level of a particular pixel 202 in the LED matrix 200. For each other pixel in the LED matrix 200, the videoconferencing controller 700 divides its pixel value by the maximum pixel value to get the occlusion factor for each particular pixel 200.

In this way, the videoconferencing controller 700 sets, a notional "correct" level to be the one of the maximum pixels. The videoconferencing controller 700 implicitly assumes that the maximum pixel is unoccluded. If this is not the case, the effect is a uniformly darker image, but this is not an effect that is apparent to the local user 106, and not experienced as a significant artifact. Accordingly, the videoconferencing controller 700 determines on or more occlusion artifacts 302 as shown in step 904 of FIG. 9.

In a similar way, it may be the case that the target and illumination properties during calibration are such that the ideal, unoccluded, image is not uniform, but has slight variations. Typically, such variations are of low spatial frequency, and will cause low frequency artifacts in the compensated results that are either not noticeable at all to the user or not experienced as significant artifacts to the local user 106.

The videoconferencing controller 700 assumes that occlusions are not severe enough to completely occlude parts of a camera pixel (not shown) (e.g. occlusion factor 0.0), but only occlude parts of the incoming light, for each camera pixel. In some embodiments, at least some of the occluding display elements are out-of-focus. In some embodiments, the optics of the camera 102 are designed to keep occluding display elements are out-of-focus.

The videoconferencing controller 700 then multiples the "correct", "unoccluded", pixel value is multiplied by. 0.0 gives total occlusion and 1.0 no occlusion. In this way by having information relating to the occlusion factor for each pixel 202, the videoconferencing controller 700 can determine the compensated camera image 404 according to step 906 in FIG. 9 by dividing each pixel value by its occlusion factor, obtaining an unoccluded and compensated camera image 404 as shown in FIG. 4c.

Optionally the steps 900, 902 relating to the compensation of the pixel artifacts 300 and steps 904, 906 relating to the compensation of the occlusion artifacts 302 can be carried out in a different order than as show in FIG. 9. Furthermore, optionally one, some or all of the steps 900, 902 relating to the compensation of the pixel artifacts 300 and steps 904, 906 relating to the compensation of the occlusion artifacts 302 can be omitted. For example, compensation for pixel artifacts 300 can be omitted. Likewise, additionally or alternatively, compensation for occlusion artifacts 302 can be omitted.

Steps 900, 902, 904, 906 are dependent on the position of the camera 102 with respect to the display 104. Accordingly, the compensation of the pixel artifacts 300 and compensation for occlusion artifacts 302 is based on the relative position of the camera 102 with respect to the display 104. This means that if the camera 102 moves with respect to the display 104, one or more of the steps as shown in FIG. 9 are repeated to recalibrate the video conferencing terminal 100.

In this way, videoconferencing controller 700 modifies an image based on the camera position of the at least one camera 102 with respect to the display.

Another embodiment will now be described in reference to FIGS. 5, 6 and 8. FIGS. 5 and 6 show a schematic perspective view of a videoconferencing terminal 100 and FIG. 8 shows a flow diagram of the operation of a videoconferencing terminal. Optionally, the method steps discussed with respect to FIG. 9 can be used together with the method steps in FIG. 8, but this is not necessary.

Turning to FIG. 5, again the axis A-A of the camera 102 is in alignment with the eyes 108 of the local user 106. In FIG. 5 the eyes 108 of the local user 106 are aligned with eyes 502 of the displayed image 500 of the remote user. Accordingly, the local user 106 and the remote user are able to make direct eye contact.

As can be seen from FIG. 5, if the local user 106 moves with respect to the display 104, the local user 106 is no longer aligned with the axis A-A of the camera 102. FIG. 5 shows one possible new position of the local user 106 represented by a dotted outline. In the new position, the local user's 106 line of sight B-B is still focused on the eyes 502 of the displayed image 500 of the remote user. However, the local user 106 is no longer looking directly at the camera 102 due the parallax error introduced by the local user 106 also moving with respect to the camera 102. This means that the captured camera image 400 of the local user 106 will not be looking directly at the camera 102.

However, FIG. 6 shows the local user 106 in the new position shown in FIG. 5. Here the position of the local user 106 is offset by a distance D1 from the axis A-A of the camera 102. This means that the eyes 108 of the local user 106 have moved from the axis A-A by a distance D1. Specifically, as shown in FIG. 6, the local user 106 is lower than the axis A-A. However, in other embodiments the local user 106 can be offset from the axis A-A of the camera 102 in any direction. For example, the local user 106 may have moved sideways with respect to the axis A-A or may be standing and the eyes 108 of the local user are above the axis A-A.

The videoconferencing controller 700 sends the image 500 of the remote user to be displayed to the face detection module 710. The face detection module 710 determines the position of the eyes 502 of the displayed image 500 of the remote user as shown in step 800 in FIG. 8. The face detection module 710 uses feature detection on an image 500 of the remote user to detect where the eyes 502 of the displayed image 500 of the remote user. The face detection module 710 then sends position information of the eyes 502 of the displayed image 500 of the remote user to the videoconferencing controller 700.

Then the videoconferencing controller 700 determines the position of the camera 102 with respect to the display 104. If the camera 102 is fixed with respect to the display 104, the videoconferencing controller 700 can store the position of the camera 102 and the axis of the camera 102 in memory.

Alternatively, the videoconferencing controller 700 can determine the relative position of the camera 102 with respect to the display 104 based on movement information of the camera 102. For example, the videoconferencing controller 700 determines the position of the camera 102 from servo information on a mechanism for moving the camera 102. Alternatively, the videoconferencing controller 700 determines the position of the camera 102 based on reference points in the captured camera image 400. For example, a reference point could be a QR code fixed to a wall behind the local user 106. In this way, the videoconferencing controller 700 determines the position and orientation of the camera 102 and the axis A-A of the camera 102 as shown in step 802 of FIG. 8.

Then the videoconferencing controller 700 sends a captured camera image 400 of the local user 106 to the face detection module 710. The face detection module 710 determines the position of the eyes 108 of the local user in the image 400 as shown in step 804 in FIG. 8. The face detection module 710 uses feature detection on the image 400 of the local user 106 to detect where the eyes 108 are in the image 400. This is similar to the step 800 in FIG. 8 for determining the position of the eyes 502 of the displayed image 500 of the remote user.

The videoconferencing controller 700 then determines a position of the eyes 108 of the local user 106 with respect to the display 104. Based on the determined position of the camera 102, the videoconferencing controller 700 determines an offset D1 between the position of the eyes 108 of the local user 106 and an axis A-A of the at least one camera 102. In this way, the videoconferencing controller 700 determines how much the local user 106 has moved from the axis A-A of the camera 102. This means that the videoconferencing controller 700 determines, a new axis A'-A' of the camera 102 based on a light ray from the new position of the local user 106 and the position of the camera 102. Accordingly, A'-A' is the new eye contact axis.

The videoconferencing controller 700 determines a position of the eyes 502 of the displayed image 500 of the remote user with respect to the display 104. That is, the videoconferencing controller 700 determines where the image 500 would be positioned on the display 104 with no modification to the image 500.

The videoconferencing controller 700 then determines whether the position of the eyes 502 of the displayed image 500 of the remote user is offset D2 from the new axis A'-A based on the new position of the local user 106. If the videoconferencing controller 700 determines that the displayed image 500 is offset greater than a predetermined threshold, the videoconferencing controller 700 sends an instruction to the image processing module 712 to modify the image 500 as show in step 806 in FIG. 8. In FIG. 6, the eyes 502 of the displayed image 500 of the remote user are translated downwards by a distance of D2 to intersect the new axis A'-A'.

In some embodiments, the videoconferencing controller 700 instructs the image processing module 712 to modify the image 500 when the new position of the local user 106 requires the local user 106 to adjust their line of sight through an arc having an angle greater than 10 degrees. In some embodiments, the image processing module 712 modifies the image 500 when the local user 106 adjusts their line of sight through an arc having an angle greater than 10 degrees in a horizontal and/or a vertical directions from the axis A-A. In this way, if the local user 106 is required to move their head or the eyes 108 of the local user to maintain eye contact with the eyes 502 of the displayed image 500 of the remote user, the videoconferencing controller 700 modifies the image 500 and returns modified image 600. This means that there is no parallax error that prevents direct eye contact between the local user 106 and the remote user because the videoconferencing controller 700 modifies an image based on the position of the camera 102 and the local user 106 with respect to the displayed image 500.

In some embodiments, the videoconferencing controller 700 sends an instruction that a co-ordinate corresponding to the centre of the eyes 502 of the displayed image 500 of the remote user is translated to a new position. The image processing module 712 returns a modified image 600 to the videoconferencing controller 700. The modified image 600 of the remote user is shown in FIG. 6.

In this way, the eyes 502 of the displayed image 500 of the remote user are moved to intersect with the new axis A'-A'. In this way, the image processing module 712 modifies the image 500 such that the eyes 502 of the displayed image 500 of the remote user intersect with the new axis A'-A'. In the new position, the local user's 106 line of sight B-B is focused on the eyes 502 of the displayed image 500 of the remote user and aligned with the new axis A'-A'. In some embodiments, the image processing module 712 modifies the image 500 by translating, scaling, or transforming or any other suitable image modification to move the position of the eyes 502 of the displayed image 500 of the remote user.

In this way, videoconferencing controller 700 modifies an image based on the camera position of the at least one camera 102 with respect to the display 104 and on the user position of the local user 106 with respect to the display 104.

As mentioned above, in some embodiments, there is only one video conferencing terminal 100 with a videoconferencing controller 700 and the image processing module 712 as discussed with reference to the previous embodiments. In these embodiments, the videoconferencing controller 700 performs the image processing as discussed with reference to embodiments as shown in the Figures e.g. FIGS. 8 and 9 for both the local video conferencing terminal 100 and the remote video conferencing terminal. This means that the advantages of the invention can be achieved for both sides of the video conference with only one video conferencing terminal 100, e.g. the local video conferencing terminal 100, according to the present invention.

When the local video conferencing terminal 100 is modifying the image for both the local and the remote video conferencing terminals 100, the videoconferencing controller 700 performs the methods described with references to the Figures for both local and the remote video conferencing terminals. The local videoconferencing controller 700 then sends instructions for modifying the displayed image to the remote video conferencing terminal. For example, translation coordinates for modifying the displayed image on the remote video conferencing terminal are sent by the local video conferencing controller 700 to the remote video conferencing terminal 100.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. A method of videoconferencing comprising:
   displaying an image of a remote user on a display, wherein the display comprises an LED matrix;
   capturing an image of a local user at a user position in front of the display, with at least one camera being located at a camera position behind the display;
   calibrating the image of the local user by capturing a camera image including a local user captured image of the local user together with pixel artifacts and occlusion artifacts by:
   determining one or more pixel artifacts captured by the at least one camera by receiving light from pixels of the display, compensating the captured camera image to remove the determined one or more pixel artifacts,
determining one or more occlusion artifacts from one or more display elements, and
compensating the captured camera image to remove the one or more occlusion artifacts,
wherein the compensated captured camera image comprises the local user captured image; and
modifying the image of the remote user to be displayed based on the camera position of the at least one camera with respect to the display and based on the user position of the local user with respect to the display.

2. A method according to claim 1 wherein the method comprises determining a position of an eye of the local user with respect to the display.

3. A method according to claim 2 wherein the method comprises determining an axis of the at least one camera based on the position of the eyes of the local user.

4. A method according to claim 1 wherein the method comprises determining a position of an eye of the remote user with respect to the display.

5. A method according to claim 4 wherein the method comprises determining an offset between the axis of the camera and an eye of the remote user in a displayed image.

6. A method according to claim 5 wherein the modifying comprises translating the image of the remote user to be displayed such that the displayed eyes of the remote user intersect with the axis.

7. A method according to claim 1 wherein occluding display elements are out of focus.

8. A method according to claim 1 wherein the user position of the user and/or the camera position of the at least one camera is moveable with respect to the display.

9. A method according to claim 1 wherein the at least one camera is one or more of the following: an RGB camera or an infrared camera.

10. A method according to claim 1 wherein the display is transmissive to electromagnetic radiation.

11. A method according to claim 1 wherein one or more of the steps is carried out during calibration and/or one or more of the steps is carried out during operation.

12. The method according to claim 1, wherein the display is an OLED display.

13. The method according to claim 1, further comprising determining a maximum pixel level of a particular pixel in the LED matrix, and, for each other pixel in the LED matrix, dividing its pixel value by the maximum pixel value to get an occlusion factor for each particular pixel.

14. A videoconferencing terminal comprising:
a display for displaying an image of a remote user, wherein the display comprises an LED matrix;
at least one camera for capturing an image of a local user at a user position in front of the display, the camera being located at a camera position behind the display; and
a controller configured to modify the image of the remote user to be displayed based on the camera position of the at least one camera with respect to the display and based on the user position of the local user with respect to the display,
wherein the controller is further configured to calibrate the image of the local user by capturing a camera image including a local user captured image of the local user together with pixel artifacts and/or occlusion artifacts, wherein the calibration comprises:
determining one or more pixel artifacts captured by the at least one camera by receiving light from pixels of the display,
compensating the captured camera image to remove the determined one or more pixel artifacts,
determining one or more occlusion artifacts from one or more display elements, and
compensating the captured camera image to remove the one or more occlusion artifacts, wherein the compensated captured camera image comprises the local user captured image.

15. A method of videoconferencing comprising:
displaying an image of a remote user on a display, wherein the display comprises LED matrix;
capturing an image of a local user at a user position in front of the display, with at least one camera being located at a camera position behind the display;
calibrating the image of the local user by capturing a camera image including a local user captured image of the local user together with pixel artifacts and/or occlusion artifacts by:
determining one or more pixel artifacts captured by the at least one camera by receiving light from pixels of the display, and
compensating the captured camera image to remove the determined one or more pixel artifacts; and
modifying the image of the remote user to be displayed based on the camera position of the at least one camera with respect to the display.

* * * * *